(12) United States Patent  
Guo et al.

(10) Patent No.: US 12,302,290 B2  
(45) Date of Patent: May 13, 2025

(54) COMMUNICATION METHOD AND COMMUNICATION APPARATUS

(71) Applicant: Huawei Technologies Co., Ltd., Shenzhen (CN)

(72) Inventors: Wenting Guo, Shanghai (CN); Hongjia Su, Shanghai (CN); Lei Lu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 296 days.

(21) Appl. No.: 17/871,171

(22) Filed: Jul. 22, 2022

(65) Prior Publication Data

US 2022/0377707 A1 Nov. 24, 2022

Related U.S. Application Data

(63) Continuation of application No. PCT/CN2020/090529, filed on May 15, 2020.

(30) Foreign Application Priority Data

Jan. 23, 2020 (WO) ................ PCT/CN2020/074039

(51) Int. Cl.  
H04W 72/02 (2009.01)  
H04L 1/00 (2006.01)  
(Continued)

(52) U.S. Cl.  
CPC ........... *H04W 72/02* (2013.01); *H04L 1/0061* (2013.01); *H04W 72/0446* (2013.01); *H04W 72/0453* (2013.01)

(58) Field of Classification Search  
None  
See application file for complete search history.

(56) References Cited

U.S. PATENT DOCUMENTS 9,496,994 B2    11/2016  Zhang et al.  
11,160,098 B2   10/2021  Lee et al.  
(Continued)

FOREIGN PATENT DOCUMENTS

CN    102448122 A    5/2012  
CN    108289019 A    7/2018  
(Continued)

OTHER PUBLICATIONS

"3rd Generation Partnership Project, Technical Specification Group Radio Access Network; NR; Multiplexing and channel coding (Release 16)," 3GPP TS 38.212 V16.0.0, Dec. 2019, 145 pages.

(Continued)

*Primary Examiner* — Xavier S Wong  
(74) *Attorney, Agent, or Firm* — SLATER MATSIL, LLP

(57) ABSTRACT

A communication method and a communication apparatus, the method including determining, based on a quantity of resource elements (REs) that are in a first time-frequency resource and that are used to transmit first information, a quantity of REs that are in the first time-frequency resource and that are used to transmit data, the first time-frequency resource including a first time unit in time domain and including a data channel resource in frequency domain, where the first information includes at least one of a control channel, a control channel demodulation pilot, a data channel demodulation pilot, second-stage control information, a phase tracking reference signal (PTRS), or a channel state information reference signal (CSI-RS).

17 Claims, 5 Drawing Sheets

(51) Int. Cl.
    *H04W 72/0446*     (2023.01)
    *H04W 72/0453*     (2023.01)

(56) References Cited

U.S. PATENT DOCUMENTS

| | | | |
|---|---|---|---|
| 11,595,977 | B2 | 2/2023 | Feng et al. |
| 11,601,919 | B2* | 3/2023 | Ye .......................... H04W 72/20 |
| 11,632,284 | B2 | 4/2023 | Lincoln et al. |
| 11,848,894 | B2* | 12/2023 | Zhang ................... H04L 5/0094 |
| 2019/0045390 | A1* | 2/2019 | Davydov ............. H04W 28/10 |
| 2019/0149365 | A1* | 5/2019 | Chatterjee ............. H04W 76/11 |
| | | | 370/329 |
| 2019/0174466 | A1 | 6/2019 | Chang et al. |
| 2019/0182807 | A1 | 6/2019 | Panteleev et al. |
| 2019/0229861 | A1 | 7/2019 | Yoshimura et al. |
| 2021/0143962 | A1* | 5/2021 | Jiang ..................... H04L 5/0051 |
| 2021/0266994 | A1 | 8/2021 | Li et al. |
| 2022/0338221 | A1* | 10/2022 | Muruganathan ...... H04W 72/23 |

FOREIGN PATENT DOCUMENTS

| | | |
|---|---|---|
| CN | 1009075955 A | 12/2018 |
| CN | 110100496 A | 8/2019 |
| EP | 3206452 A1 | 8/2017 |
| EP | 3480978 A1 | 5/2019 |
| EP | 4013161 A | 6/2022 |
| EP | 4044469 A1 | 8/2022 |
| RU | 2693848 C1 | 7/2019 |
| RU | 2701117 C1 | 9/2019 |
| WO | 2018135905 A1 | 7/2018 |

OTHER PUBLICATIONS

"3rd Generation Partnership Project; Technical Specification Group Radio Access Network; NR; Physical layer procedures for data (Release 16)," 3GPP TS 38.214 V16.0.0, Dec. 2019, 147 pages.

"3rd Generation Partnership Project; Technical Specification Group Radio Access Network; NR; Radio Resource Control (RRC) protocol specification (Release 15)," 3GPP TS 38.331 V15.8.0, Dec. 2019, 532 pages.

"LS on Transient Period in Sidelink Channels," Release: Release 16, Work Item:FS_NR_V2X, Source: RAN WG1, To: RAN WG4, 3GPP TSG RAN WG1#95, R1-1814165, Spokane, USA, Nov. 12-16, 2018, 2 pages.

"Sidelink Physical Layer Structure for NR V2X," Agenda Item: 7.2.4.1.1, Source: Huawei, HISilicon, Document for: Discussion and Decision, 3GPP TSG RAN WG1 Meeting #98bis, R1-1910054, Chongqing, China, Oct. 14-20, 2019, 35 pages.

"NR V2X Sidelink Physical Layer Procedures," Agenda Item: 7.2.4.5, Source: Apple, Document for: Discussion/ Decision, 3GPP TSG RAN WG1 #98bis, R1-1910964, Chongqing, China, Oct. 14-20, 2019, 7 pages.

"On NR V2X Physical Layer Structure," Agenda Item: 7.2.4.1, Source: Apple, Document for: Discussion/Decision, 3GPP TSG RAN WG1 #99, R1-1912810, Reno, USA, Nov. 18-22, 2019, 15 pages.

"Draft Text Proposals on Physical Layer Structure for NR-V2X," Source: OPPO, Agenda Item: 7.2.4.1, Document for: Discussion and Decision, 3GPP TSG RAN WG1 #100, R1-2000489, e-Meeting, Feb. 24-Mar. 6, 2020, 16 pages.

"Sidelink Physical Structure for NR V2X Communication," Source: Intel Corporation, Agenda Item: 7.2.4.1, Document for: Discussion and Decision, 3GPP TSG RAN WG1 Meeting #98bis, R1-1910648, Chongqing, China, Oct. 14-20, 2019, 29 pages.

"Sidelink Physical Layer Procedure for NR V2X," Source: NTT Docomo, Inc., Agenda Item: 7.2.4.5, Document for: Discussion and Decision, 3GPP TSG RAN WG1 #98bis, R1-1911173, Chongqing, China, Oct. 14-20, 2019, 17 pages.

"Discussion on Physical Layer Structure for NR Sidelink," Agenda Item: 7.2.4.1, Source: LG Electronics, Document for: Discussion and Decision, 3GPP TSG RAN WG1 #98bis, R1-1911346, Chongqing, China, Oct. 14-20, 2019, 41 pages.

"Remaining Details on Physical Layer Structure for the Sidelink," Agenda Item: 7.2.4.1, Source: Futurewei, Document for: Discussion and Decision, 3GPP TSG RAN WG1 Meeting #99, R1-1912428, Reno, USA, Nov. 18-22, 2019, 10 pages.

"Discussion on Physical Layer Structure for Sidelink in NR V2X," Source: Panasonic, Agenda Item: 7.2.4.1, Item for: Discussion and Decision, 3GPP TSG RAN WG1 #99, R1-1912752, Reno, USA, Nov. 18-22, 2019, 11 pages.

\* cited by examiner

COMMUNICATION METHOD AND COMMUNICATION APPARATUS

CROSS-REFERENCE TO RELATED APPLICATIONS

This application is a continuation of International Application No. PCT/CN2020/090529, filed on May 15, 2020, which claims priority to International Application No. PCT/CN2020/074039, filed on Jan. 23, 2020. The disclosures of the aforementioned applications are hereby incorporated by reference in their entireties.

TECHNICAL FIELD

This application relates to the communication field, and more specifically, to a communication method and a communication apparatus.

BACKGROUND

In a communication system, data is organized as transport blocks (transport blocks, TBs) for transmission. Before the TB is transmitted, a transport block size (transport block size, TBS) needs to be first determined based on a quantity of resource elements (resource elements, REs) used to transmit data.

A current standard defines how to determine the quantity of REs used to transmit data over an air interface. However, in a vehicle to everything (vehicle to everything, V2X) scenario, because a frame structure is different from an air interface frame structure, methods defined in the standard is no longer applicable. Therefore, for the V2X scenario, a method for determining a quantity of REs used to transmit data needs to be provided.

SUMMARY

This application provides a communication method and a communication apparatus, to determine a quantity of REs used to transmit data in a V2X scenario.

According to a first aspect, a communication method is provided. The method may be applied to a V2X transmit-end terminal device, or may be applied to a V2X receive-end terminal device. The method includes: determining, based on a quantity of REs that are in a first time-frequency resource and that are used to transmit first information, a quantity of REs that are in the first time-frequency resource and that are used to transmit data. The first time-frequency resource includes a first time unit in time domain and includes a data channel resource in frequency domain. The first information includes at least one of the following: a control channel, a control channel demodulation pilot, a data channel demodulation pilot, second-stage control information, a phase tracking reference signal (Phase tracking reference signal, PTRS), and a channel state information reference signal (Channel state information reference signal, CSI-RS).

Optionally, in a scenario in which the method is applied to the transmit-end terminal device, the method may further include: determining a transport block size based on the determined quantity of REs used to transmit the data; and sending a transport block.

Optionally, in a scenario in which the method is applied to the receive-end terminal device, the method may further include: determining a transport block size based on the determined quantity of REs used to transmit the data; and receiving a transport block. Receiving a transport block means performing channel decoding on the transport block.

In this application, the data channel resource is used for sidelink communication. The data channel resource may include several sub-channels (sub-channels).

The first time unit is used for sidelink communication, and may include symbols other than the first symbol and the last symbol in a sidelink communication slot. For example, the first symbol in the sidelink communication slot may be used for automatic gain control (automatic gain control, AGC), and the last symbol is a gap (GAP) symbol.

According to the method provided in this application, a quantity of REs used to transmit sidelink data may be determined based on quantities of REs used to transmit the control channel, the control channel demodulation pilot, the data channel demodulation pilot, the second-stage control information, the CSI-RS, and/or the PTRS. Further, a transport block size of a sidelink may be determined based on the quantity of REs used to transmit the sidelink data.

Optionally, the first time-frequency resource includes $N_{PSSCH}^{sub-ch}$ first sub-resources, the first sub-resource includes the first time unit in time domain and includes one sub-channel in the data channel resource in frequency domain, and $N_{PSSCH}^{sub-ch}$ is a positive integer. The first information includes first sub-information and second sub-information, the first sub-information is the control channel, the control channel demodulation pilot, and the second-stage control information, and the second sub-information includes at least one of the following: the data channel demodulation pilot, the PTRS, or the CSI-RS.

The determining, based on a quantity of resource elements REs that are in a first time-frequency resource and that are used to transmit first information, a quantity of REs that are in the first time-frequency resource and that are used to transmit data includes: determining, based on a quantity of REs that are in each first sub-resource and that are used to transmit the second sub-information, a sum of quantities of REs that are in each first sub-resource and that are used to transmit the data and the first sub-information; and determining, based on the sum of the quantities of REs that are in each first sub-resource and that are used to transmit the data and the first sub-information, and a quantity of REs that are in the first time-frequency resource and that are used to transmit the first sub-information, the quantity of REs that are in the first time-frequency resource and that are used to transmit the data.

For example, in this application, $l_\alpha$ represents a quantity of symbols in the first time unit that are adjusted for calculating a transport block size of a data channel. $l_\alpha$ may be 0, or may be one of 1, 2, and 3.

Optionally, a sum of quantities of REs that are in an $i^{th}$ first sub-resource in the first time-frequency resource and that are used to transmit the data and the first sub-information satisfies Formula (1):

$$N'_{RE,i} = N_{SC}^{PRB} * N_{sub-ch}^{PRB} * N_{syml}^{sh'} - N_{DMRS}^{i} - N_{oh} \qquad (1)$$

$N'_{RE,i}$ represents the sum of the quantities of REs that are in the $i^{th}$ first sub-resource and that are used to transmit the data and the first sub-information, and i=0, 1, ..., $N_{PSSCH}^{sub-ch} - 1$. $N_{SC}^{PRB}$ represents a quantity of subcarriers in a physical resource block (physical resource block, PRB), $N_{sub-ch}^{PRB}$ represents a quantity of PRBs in the sub-channel, $N_{syml}^{sh'}$, represents a quantity of symbols in the first time unit that are available for encoding, $N_{syml}^{sh'} = N_{syml}^{sh} - l_\alpha$, $N_{syml}^{sh}$ represents a quantity of symbols in the first time unit, $l_\alpha$ represents a transport block adjustment factor, $N_{DMRS}^{i}$ represents a quantity of REs that are in the $i^{th}$ first sub-resource and that are used to transmit the data channel demodulation pilot, and $N_{oh}$ includes a sum of quantities of REs that are in the $i^{th}$ first sub-resource and that are used to transmit the PTRS and/or the CSI-RS.

$N_{oh}$ described herein and below may be preconfigured (that is, as specified in a protocol), or may be configured by a network device to a resource pool.

Optionally, the quantity of REs that are in the first time-frequency resource and that are used to transmit the data satisfies (2):

$$N_{RE}=\Sigma_{i=0}^{N_{PSSCH}^{sub-ch}-1} N'_{RE,i} - N_{PSCCH}^{RE} - N_{oh\_SCI2}^{RE} \qquad (2)$$

$N_{RE}$ represents the quantity of REs that are in the first time-frequency resource and that are used to transmit the data, $N_{PSCCH}^{RE}$ represents a sum of quantities of REs that are in the first time-frequency resource and that are used to transmit the control channel and the control channel demodulation pilot in the first sub-information, and $N_{oh\_SCI2}^{RE}$ represents a quantity of REs that are in the first time-frequency resource and that are used to transmit the second-stage control information in the first sub-information.

Optionally, the first time-frequency resource includes $N_{PSSCH}^{PRB}$ second sub-resources, the second sub-resource includes the first time unit in time domain and includes one physical resource block PRB in the data channel resource in frequency domain, and $N_{PSSCH}^{PRB}$ is a positive integer. The first information includes first sub-information and second sub-information, the first sub-information is the control channel, the control channel demodulation pilot, and the second-stage control information, and the second sub-information includes at least one of the following: the data channel demodulation pilot, the PTRS, or the CSI-RS.

The determining, based on a quantity of resource elements REs that are in a first time-frequency resource and that are used to transmit first information, a quantity of REs that are in the first time-frequency resource and that are used to transmit data includes: determining, based on a quantity of REs that are in each second sub-resource and that are used to transmit the second sub-information, a sum of quantities of REs that are in each second sub-resource and that are used to transmit the data and the first sub-information; and determining, based on the sum of the quantities of REs that are in each second sub-resource and that are used to transmit the data and the first sub-information, and a quantity of REs that are in the first time-frequency resource and that are used to transmit the first sub-information, the quantity of REs that are in the first time-frequency resource and that are used to transmit the data.

Optionally, a sum of quantities of REs that are in an $i^{th}$ second sub-resource in the first time-frequency resource and that are used to transmit the data and the first sub-information satisfies Formula (14):

$$N'_{RE,i}=N_{SC}^{PRB} * N_{symI}^{sh'} - N_{DMRS}^{i} - N_{oh} \qquad (14)$$

$N'_{RE,i}$ represents the sum of the quantities of REs that are in the $i^{th}$ second sub-resource and that are used to transmit the data and the first sub-information, and i=0, 1, ..., $N_{PSSCH}^{PRB}-1$.

$N_{SC}^{PRB}$ represents a quantity of subcarriers in the PRB, $N_{symI}^{sh'}$ represents a quantity of symbols in the first time unit that are available for encoding, $N_{symI}^{sh'}=N_{symI}^{sh}-1_\alpha$, $NN_{symI}^{sh}$ represents a quantity of symbols in the first time unit, $N_{DMRS}^{i}$ represents a quantity of REs that are in the $i^{th}$ second sub-resource and that are used to transmit the data channel demodulation pilot, $1_\alpha$ represents a transport block adjustment factor, and $N_{oh}$ includes a sum of quantities of REs that are in the $i^{th}$ second sub-resource and that are used to transmit the PTRS and/or the CSI-RS.

Optionally, the quantity of REs that are in the first time-frequency resource and that are used to transmit the data satisfies Formula (15):

$$N_{RE}=\Sigma_{i=0}^{N_{PSSCH}^{PRB}-1} N'^{RE,i} - N_{PSCCH}^{RE} - N_{oh\_SCI2}^{RE} \qquad (15)$$

$N_{RE}$ represents the quantity of REs that are in the first time-frequency resource and that are used to transmit the data, $N_{PSCCH}^{RE}$ represents a sum of quantities of REs that are in the first time-frequency resource and that are used to transmit the control channel and the control channel demodulation pilot in the first sub-information, and $N_{oh\_SCI2}^{RE}$ represents a quantity of REs that are in the first time-frequency resource and that are used to transmit the second-stage control information in the first sub-information.

Optionally, $N_{PSCCH}^{RE}$ satisfies:

$$N_{PSCCH}^{RE}=N_{sc}^{PRB} * N_{symI}^{PSCCH} * N_{PSCCH}^{PRB}$$

$N_{symI}^{PSCCH}$ represents a quantity of symbols that are in the first time unit and that are used to transmit the control channel, and $N_{PSCCH}^{PRB}$ represents a quantity of PRBs that are in the data channel resource and that are used to transmit the control channel.

For example, in this application, $N_{oh\_SCI2}^{RE}$ satisfies Formula (4):

$$N_{oh\_SCI2}^{RE} = \min\left\{\left\lceil \frac{(O_{SCI2}+L_{SCI2})*\bar{\beta}}{R*Q_m} \right\rceil, \left\lceil \alpha \sum_{l=0}^{N_{symI}^{sh}-1} M_{sc}^{SCI2}(l) \right\rceil \right\} + \gamma \qquad (4)$$

$O_{SCI2}$ represents a valid payload size of the second-stage control information, $L_{SCI2}$ represents a cyclic redundancy check CRC bit length of the second-stage control information, R represents a bit rate of a data channel, $Q_m$ represents a modulation order of the data channel, $\bar{\beta}$ represents an equivalent scale factor of a bit rate of the second-stage control information, $N_{symI}^{sh}$ represents a quantity of symbols in the first time unit, $M_{sc}^{SCI2}(l)$ represents a quantity of REs that are in a time-frequency resource formed by symbol l in the first time unit and the data channel resource and that are used to transmit the second-stage control information, a represents a scale factor of a resource used to transmit the second-stage control information, and γ represents a quantity of REs that is defined to satisfy that the second-stage control information occupies an integer quantity of PRBs.

In a possible example, $M_{sc}^{SCI2}(l)$ is determined based on at least one of a quantity of subcarriers occupied by the data channel pilot on symbol l in the first time unit, a quantity of subcarriers occupied by the PTRS on symbol l in the first time unit, a quantity of subcarriers occupied by the CSI-RS on symbol l in the first time unit, and a quantity of subcarriers occupied by the control channel on symbol l in the first time unit.

For example, when $M_{sc}^{SCI2}(l)$ is determined based on the quantities of subcarriers occupied by the data channel pilot, the PTRS, the CSI-RS, and the control channel on symbol l in the first time unit, $M_{sc}^{SCI2}(l)$ satisfies Formula (4c):

$$M_{sc}^{SCI2}(l)=M_{sc}^{PSSCH}(l)-M_{sc}^{DMRS}(l)-M_{sc}^{PTRS}(l)-M_{sc}^{CSI-RS}(l)-M_{sc}^{PSCCH}(l) \qquad (4c)$$

$M_{sc}^{PSSCH}(l)$ is a quantity of subcarriers in a data channel scheduling bandwidth, $M_{sc}^{DMRS}(l)$ is the quantity of subcarriers occupied by the data channel pilot on symbol l, $M_{sc}^{PTRS}(l)$ is the quantity of subcarriers occupied by the PTRS on symbol l, $M_{sc}^{CSI-RS}(l)$ is the quantity of subcarriers occupied by the CSI-RS on symbol l, and $M_{sc}^{PSCCH}(l)$ is the quantity of subcarriers occupied by the control channel on symbol l.

It should be understood that, when $M_{sc}^{SCI2}(l)$ is not related to one or more of the quantities of subcarriers occupied by the data channel pilot, the PTRS, the CSI-RS, or the control channel on symbol l, $M_{sc}^{SCI2}(l)$ may be obtained by removing a corresponding parameter from Formula (4c).

For example, when $M_{sc}^{SCI2}(l)$ is determined based on the quantities of subcarriers occupied by the data channel pilot, the PTRS, and the control channel on symbol l, $M_{sc}^{SCI2}(l)$ satisfies Formula (4d):

$$M_{sc}^{SCI2}(l)=M_{sc}^{PSSCH}(l)-M_{sc}^{DMRS}(l)-M_{sc}^{PT-RS}(l)-M_{sc}^{PSCCH}(l) \quad (4d)$$

When $M_{sc}^{SCI2}(l)$ is determined based on the quantity of subcarriers occupied by the control channel on symbol l, $M_{sc}^{SCI2}(l)$ satisfies Formula (4e):

$$M_{sc}^{SCI2}(l)=M_{sc}^{PSSCH}(l)-M_{sc}^{PSCCH}(l) \quad (4e)$$

Considering that quantities of subcarriers in the data channel scheduling bandwidth on all symbols are the same, $M_{sc}^{PSSCH}(l)$ may be represented as $M_{sc}^{PSSCH}$. In addition, on symbol l to which the control channel is not mapped, $M_{sc}^{PSCCH}(l)=0$. On symbol l to which the control channel is mapped, a quantity of included subcarriers of the control channel is the same. To be specific, on symbol i to which the control channel is mapped, $M_{sc}^{PSCCH}(l)=M_{sc}^{PSCCH} \cdot M_{sc}^{PSCCH}$ is a quantity that is of subcarriers available for the data channel in frequency domain and that is configured by higher layer RRC. In this case, Formula (3) is transformed into Formula (5).

$$N_{oh\_SCI2}^{RE} = \min\left\{\left\lceil\frac{(O_{SCI2}+L_{SCI2})*\bar{\beta}}{R*Q_m}\right\rceil, \alpha\left(N_{syml}^{sh}*M_{SC}^{PSSCH}-N_{syml}^{PSCCH}*M_{SC}^{PSCCH}\right)\right\}+\gamma \quad (5)$$

$N_{syml}^{PSCCH}$ is a quantity that is of symbols available for the control channel in time domain and that is configured by a higher layer. For meanings of other parameters, refer to the foregoing descriptions of the corresponding parameters.

It should be understood that, in this application, $\lceil \ \rceil$ represents rounding up, and min(x, y) represents calculating a smaller value in x and y.

For example, in this application, $N_{oh\_SCI2}^{RE}$ satisfies any one of Formula (7) to Formula (10):

$$N_{oh\_SCI2}^{RE} = \min\left\{\left\lceil\frac{(O_{SCI2}+L_{SCI2})*\bar{\beta}}{R*Q}\right\rceil, N_{SCI2}^{bound}\right\}+\gamma \quad (7)$$

$$N_{oh\_SCI2}^{RE} = \min\left\{\left\lceil\frac{(O_{SCI2}+L_{SCI2})*\bar{\beta}}{R*Q}\right\rceil, N_{SCI2}^{bound}\right\} \quad (8)$$

$$N_{oh\_SCI2}^{RE} = \min\left\{\left\lceil\frac{(O_{SCI2}+L_{SCI2})*\bar{\beta}}{v*R*Q}\right\rceil, N_{SCI2}^{bound}\right\}+\gamma \quad (9)$$

$$N_{oh\_SCI2}^{RE} = \min\left\{\left\lceil\frac{(O_{SCI2}+L_{SCI2})*\bar{\beta}}{v*R*Q}\right\rceil, N_{SCI2}^{bound}\right\} \quad (10)$$

$O_{SCI2}$ represents a valid payload size of the second-stage control information, $L_{SCI2}$ represents a cyclic redundancy check CRC bit length of the second-stage control information, R represents a bit rate of a data channel, Q represents a modulation order of the data channel or the control channel, $\bar{\beta}$ represents an equivalent scale factor of a bit rate of the second-stage control information, or represents a scale factor that is of a resource for the second-stage control information and that is indicated by the first control information, v represents a quantity of spatial layers of the data channel; $N_{SCI2}^{bound}$ represents an upper limit of a quantity of REs occupied by the second-stage control information; and $\gamma$ represents a quantity of REs that is defined to satisfy that the second-stage control information occupies an integer quantity of PRBs.

In a possible example, to avoid impact of a reference signal in a TBS determining process, a value of $\gamma$ may be defined as 0, 3, 6, or 9; or $\gamma$ is a preconfigured integer from 0 to 11, that is, $\gamma$ may be any value in a set {0,1,2,3,4,5,6,7,8,9,10,11}.

In a possible example, $N_{SCI2}^{bound}$ is a preconfigured fixed value P, and P is a positive integer. For example, P is 1024, 1536, or 2048; or P is a preconfigured maximum encoding or decoding capability of control information of a terminal device.

In a possible example, $N_{SCI2}^{bound}$ satisfies Formula (ii):

$$N_{SCI2}^{bound} = \left\lceil \alpha \sum_{l=0}^{N_{syml}^{sh''}-1} M_{sc}^{PSSCH}(l) \right\rceil \quad (11)$$

$N_{syml}^{sh''}$ represents a quantity of symbols in the first time unit excluding a PSFCH. $M_{sc}^{PSSCH}(l)$ represents a quantity of subcarriers in a data channel scheduling bandwidth. $\alpha$ represents a scale factor of a resource used to transmit the second-stage control information, where $0<\alpha\leq 1$.

For example, $N_{syml}^{sh''}$ satisfies Formula (11a) or (11b):

$$N_{syml}^{sh''}=N_{syml}^{sh}-N_{symbol}^{PSFCH} \quad (11a)$$

$$N_{syml}^{sh''}=\text{lengthSLsymbols}-N_{symbol}^{PSFCH}-2 \quad (11b)$$

lengthSLsymbols is a quantity that is of symbols included in a sidelink communication slot and that is configured by higher layer RRC, and N is a quantity of symbols occupied by the PSFCH, and is related to a configuration period of the PSFCH. For example, when the configuration period of the PSFCH is 0, N=0; or when the configuration period of the PSFCH is 1, 2, or 4, $N_{symbol}^{PSFCH}=0$ or $N_{symbol}^{PSFCH}=3$. Alternatively, based on a specific value of the configuration period of the PSFCH, $N_{symbol}^{PSFCH} \in \{0,1,2,3\}$, that is, $N_{symbol}^{PSFCH}$ is any value in a set {0,1,2,3}.

In a possible example, $M_{sc}^{PSSCH}(l)$ is the same on all symbols, that is, $M_{sc}^{PSSCH}(i)=M_{sc}^{PSSCH}(j)$, i=0,1, . . . , $N_{syml}^{sh''}-1$, j=0,1, . . . , $N_{syml}^{sh''}-1$, and i is not equal to j. In this case, $M_{sc}^{PSSCH}(l)$ may be represented as $M_{sc}^{PSSCH}$. Correspondingly, Formula (11) is transformed into:

$$=\lceil \alpha(N_{syml}^{sh''}*M_{sc}^{PSSCH}) \rceil$$

In a possible example, considering resources occupied by the control channel, $N_{SCI2}^{bound}$ is defined as a part of a sum of quantities of REs of the data channel in the data channel scheduling bandwidth, that is, $N_{SCI2}^{bound}$ satisfies Formula (12):

$$N_{SCI2}^{bound} = \left\lceil \alpha \sum_{l=0}^{N_{syml}^{sh''}-1} \left(M_{sc}^{PSSCH}(l)-M_{sc}^{PSCCH}(l)\right) \right\rceil \quad (12)$$

$N_{syml}^{sh''}$ represents a quantity of symbols in the first time unit excluding a PSFCH. $M_{sc}^{PSSCH}(l)$ represents a quantity of subcarriers in a data channel scheduling bandwidth, and $M_{sc}^{PSSCH}(l)$ is a quantity that is of subcarriers in a control channel bandwidth on symbol 1 and that is configured by higher layer RRC. α represents a scale factor of a resource used to transmit the second-stage control information, where 0<α≤1.

Further, for a possible value of $N_{syml}^{sh''}$, refer to Formula (11a) or Formula (11b).

Further, considering that quantities of subcarriers included in the data channel scheduling bandwidth on all symbols are the same, $M_{sc}^{PSSCH}(l)$ may be represented as $M_{sc}^{PSSCH}$, and $M_{sc}^{PSSCH}$ is the quantity of subcarriers in the data channel scheduling bandwidth. In addition, on symbol i to which the control channel is not mapped, $M_{sc}^{PSSCH}(l)=0$. On symbol l to which the control channel is mapped, a quantity of included subcarriers of the control channel is the same. To be specific, on symbol i to which the control channel is mapped, $M_{sc}^{PSSCH}(l)=M_{sc}^{PSCCH}M_{sc}^{PSSCH}$ is a quantity that is of subcarriers available for the data channel in frequency domain and that is configured by higher layer RRC. In this case, Formula (12) is transformed into Formula (13):

$$N_{SCI2}^{bound} = \lceil \alpha(N_{syml}^{sh''} * M_{sc}^{PSSCH} - N_{syml}^{PSCCH} * M_{sc}^{PSCCH}) \rceil \quad (13)$$

In the foregoing example, the data channel scheduling bandwidth is indicated on the control channel.

Optionally, $\bar{\beta}$ satisfies Formula (4a) or Formula (4b):

$$\bar{\beta} = \beta_{offset}^{SCI2} \quad (4a)$$

$$\bar{\beta} = \frac{1}{M}\sum_{q=0}^{M-1} \beta_{offset,q}^{SCI2} \quad (4b)$$

$\beta_{offset}^{SCI2}$ represents a scale factor of a bit rate of the second-stage control information, $\beta_{offset,q}^{SCI2}$ represents a $q^{th}$ scale factor in M scale factors configured in a resource pool to which the data channel resource belongs, and the scale factor is the scale factor of the bit rate of the second-stage control information. Optionally, $N_{oh\_SCI2}^{RE}$ satisfies Formula (6):

$$N_{oh\_SCI2}^{RE} = \frac{1}{M}\sum_{q=0}^{M-1} \dot{N}_{oh\_SCI2,\beta_{offset,q}^{SCI2}}^{RE} \quad (6)$$

$$\dot{N}_{oh\_SCI2,\beta_{offset,q}^{SCI2}}^{RE} = \min\left\{\left\lceil \frac{(O_{SCI2} + L_{SCI2}) * \beta_{offset,q}^{SCI2}}{R * Q_m} \right\rceil, \left[\alpha \cdot \sum_{l=0}^{N_{syml}^{sh}-1} M_{sc}^{SCI2}(l)\right]\right\} + \gamma \quad (6a)$$

$O_{SCI2}$ represents a valid payload size of the second-stage control information, $L_{SCI2}$ represents a CRC bit length of the second-stage control information, R represents a bit rate of a data channel, $Q_m$ represents a modulation order of the data channel, $N_{syml}^{sh}$ represents a quantity of symbols in the first time unit, $M_{sc}^{SCI2}(l)$ represents a quantity of REs that are in a time-frequency resource formed by symbol l in the first time unit and the data channel resource and that are used to transmit the second-stage control information, α represents a scale factor of a resource used to transmit the second-stage control information, γ represents a quantity of REs that is defined to satisfy that the second-stage control information occupies an integer quantity of PRBs, $\beta_{offset,q}^{SCI2}$ represents a $q^{th}$ scale factor in M scale factors configured in a resource pool to which the data channel resource belongs, and the scale factor is a scale factor of a bit rate of the second-stage control information.

Optionally, the first time-frequency resource includes $N_{PSSCH}^{sub-ch}$ first sub-resources, the first sub-resource includes the first time unit in time domain and includes one sub-channel in the data channel resource in frequency domain, and $N_{PSSCH}^{sub-ch}$ is a positive integer.

The first information includes the second-stage control information and third sub-information, and the third sub-information includes at least one of the following: the data channel demodulation pilot, the control channel, the control channel demodulation pilot, the PTRS, or the CSI-RS.

The determining, based on a quantity of resource elements REs that are in a first time-frequency resource and that are used to transmit first information, a quantity of REs that are in the first time-frequency resource and that are used to transmit data includes determining, based on a quantity of REs that are in each first sub-resource and that are used to transmit the third sub-information, a sum of quantities of REs that are in each first sub-resource and that are used to transmit the data and the second-stage control information, and determining, based on the sum of the quantities of REs that are in each first sub-resource and that are used to transmit the data and the second-stage control information, and a quantity of REs that are in the first time-frequency resource and that are used to transmit the second-stage control information, the quantity of REs that are in the first time-frequency resource and that are used to transmit the data.

Optionally, a sum of quantities of REs that are in an $i^{th}$ first sub-resource in the first time-frequency resource and that are used to transmit the data and the second-stage control information satisfies Formula (14):

$$N'_{RE,i} = N_{SC}^{PRB} * N_{sub-ch}^{PRB} * N_{syml}^{sh'} - N_{DMRS}^{i} - N_{oh} \quad (14)$$

$N'_{RE,i}$ represents the sum of the quantities of REs that are in the $i^{th}$ first sub-resource and that are used to transmit the data and the second-stage control information, and i=0, 1, . . . , $N_{PSSCH}^{sub-ch}-1$.

$N_{SC}^{PRB}$ represents a quantity of subcarriers in a physical resource block PRB, $N_{sub-ch}^{PRB}$ represents a quantity of PRBs in the sub-channel, $N_{syml}^{sh'}$ represents a quantity of symbols in the first time unit that are available for encoding, $N_{syml}^{sh'}=N_{syml}^{sh}-1_\alpha$, $N_{syml}^{sh}$ represents a quantity of symbols in the first time unit, $1_\alpha$ represents a transport block adjustment factor, $N_{DMRS}^{i}$ represents a quantity of REs that are in the $i^{th}$ first sub-resource and that are used to transmit the data channel demodulation pilot, and $N_{oh}$ includes a quantity of REs that are in the $i^{th}$ first sub-resource and that are used to transmit at least one of the following: the control channel, the control channel demodulation pilot, the PTRS, or the CSI-RS.

Optionally, the quantity of REs that are in the first time-frequency resource and that are used to transmit the data satisfies Formula (15):

$$N_{RE} = \Sigma_{i=0}^{N_{PSSCH}^{sub-ch}-1} N'_{RE,i} - N_{oh\_SCI2}^{RE} \quad (15)$$

$N_{RE}$ represents the quantity of REs that are in the first time-frequency resource and that are used to transmit the data, and $N_{oh\_SCI2}$ represents a quantity of REs that are in the first time-frequency resource and that are used to transmit the second-stage control information.

Optionally, the first time-frequency resource includes $N_{PSSCH}^{PRB}$ second sub-resources, the second sub-resource includes the first time unit in time domain and includes one physical resource block PRB in the data channel resource in frequency domain, and $N_{PSSCH}^{PRB}$ is a positive integer.

The first information includes the second-stage control information and third sub-information, and the third sub-information includes at least one of the following: the data channel demodulation pilot, the control channel, the control channel demodulation pilot, the PTRS, or the CSI-RS.

The determining, based on a quantity of resource elements REs that are in a first time-frequency resource and that are used to transmit first information, a quantity of REs that are in the first time-frequency resource and that are used to transmit data includes determining, based on a quantity of REs that are in each second sub-resource and that are used to transmit the third sub-information, a sum of quantities of REs that are in each second sub-resource and that are used to transmit the data and the second-stage control information, and determining, based on the sum of the quantities of REs that are in each second sub-resource and that are used to transmit the data and the second-stage control information, and a quantity of REs that are in the first time-frequency resource and that are used to transmit the second-stage control information, the quantity of REs that are in the first time-frequency resource and that are used to transmit the data.

Optionally, a sum of quantities of REs that are in an $i^{th}$ second sub-resource in the first time-frequency resource and that are used to transmit the data and the second-stage control information satisfies Formula (16):

$$N'_{RE,i}=N_{SC}^{PRB}*N_{syml}^{sh'}-N_{DMRS}^{i}-N_{oh} \quad (16)$$

$N'_{RE,i}$ represents the sum of the quantities of REs that are in the $i^{th}$ second sub-resource and that are used to transmit the data and the second-stage control information, and $i=0, 1, \ldots, N_{PSSCH}^{PRB}-1$.

$N_{SC}^{PRB}$ represents a quantity of subcarriers in the PRB, $N_{syml}^{sh'}$ represents a quantity of symbols in the first time unit that are available for encoding, $N_{syml}^{sh'}=N_{syml}^{sh}-1_{\alpha}$, $N_{syml}^{sh}$ represents a quantity of symbols in the first time unit, $1_{\alpha}$ represents a transport block adjustment factor, $N_{DMRS}^{i}$ represents a quantity of REs that are in the $i^{th}$ first sub-resource and that are used to transmit the data channel demodulation pilot, and $N_{oh}$ includes a quantity of REs that are in the $i^{th}$ second sub-resource and that are used to transmit at least one of the following: the control channel, the control channel demodulation pilot, the PTRS, or the CSI-RS.

Optionally, the quantity of REs that are in the first time-frequency resource and that are used to transmit the data satisfies Formula (17):

$$N_{RE}=\Sigma_{i=0}^{N_{PSSCH}^{PRB}-1}N'_{RE,i}-N_{oh\_SCI2}^{RE} \quad (17)$$

$N_{RE}$ represents the quantity of REs that are in the first time-frequency resource and that are used to transmit the data, and $N_{oh\_SCI2}^{RE}$ represents a quantity of REs that are in the first time-frequency resource and that are used to transmit the second-stage control information.

optionally, the first time-frequency resource includes $N_{PSSCH}^{sub-ch}$ first sub-resources, the first sub-resource includes the first time unit in time domain and includes one sub-channel in the data channel resource in frequency domain, and $N_{PSSCH}^{sub-ch}$ is a positive integer.

The determining, based on a quantity of resource elements REs that are in a first time-frequency resource and that are used to transmit first information, a quantity of REs that are in the first time-frequency resource and that are used to transmit data includes determining, based on a quantity of REs that are in each first sub-resource and that are used to transmit the first information, a quantity of REs that are in each first sub-resource and that are used to transmit the data.

A sum of quantities of REs that are in the $N_{PSSCH}^{sub-ch}$ first sub-resources and that are used to transmit the data is equal to the quantity of REs that are in the first time-frequency resource and that are used to transmit the data.

Optionally, a quantity of REs that are in an $i^{th}$ first sub-resource in the first time-frequency resource and that are used to transmit the data satisfies Formula (20):

$$N_{RE}^{i}=N_{SC}^{RB}*N_{sub-ch}^{PRB}*N_{syml}^{sh'}-N_{DMRS}^{i}-N_{PSCCH}^{i}-N_{oh} \quad (20)$$

$N_{RE}^{i}$ represents the quantity of REs that are in the $i^{th}$ first sub-resource and that are used to transmit the data, and $i=0, 1, \ldots, N_{PSSCH}^{sub-ch}-1$.

$N_{SC}^{PRB}$ represents a quantity of subcarriers in a physical resource block PRB, $N_{sub-ch}^{PRB}$ represents a quantity of PRBs in the sub-channel, $N_{syml}^{sh'}$ represents a quantity of symbols in the first time unit that are available for encoding, $N_{syml}^{sh'}=NN_{syml}^{sh}-1_{\alpha}$, $NN_{syml}^{sh}$ represents a quantity of symbols in the first time unit, $1_{\alpha}$ represents a transport block adjustment factor, $N_{DMRS}^{i}$ represents a quantity of REs that are in the $i^{th}$ first sub-resource and that are used to transmit the data channel demodulation pilot, $N_{PSCCH}^{i}$ represents a sum of quantities of REs that are in the $i^{th}$ first sub-resource and that are used to transmit the control channel and the control channel demodulation pilot, and $N_{oh}$ represents a quantity of REs that are in the $i^{th}$ first sub-resource and that are used to transmit fourth sub-information, where the fourth sub-information includes the second-stage control information, the PTRS, and/or the CSI-RS in the first information.

Optionally, when $i=0$, $N_{PSCCH}^{i}=N_{SC}^{PRB}*N_{syml}^{PSCCH}*N_{PSCCH}^{PRB}$; or when $i>0$, $N_{PSCCH}^{i}=0$.

$N_{syml}^{PSSCH}$ represents a quantity of symbols that are in the first time unit and that are used to transmit the control channel, and $N_{PSCCH}^{PRB}$ represents a quantity of PRBs that are in the data channel resource and that are used to transmit the control channel.

Optionally, a quantity of REs that are in an $i^{th}$ first sub-resource in the first time-frequency resource and that are used to transmit the data satisfies Formula (21):

$$N_{RE}^{i}=N_{SC}^{PRB}*N_{sub-ch}^{PRB}*S_{syml}^{sh'}-N_{DMRS}^{i}-N_{oh} \quad (21)$$

$N_{RE}^{i}$ represents the quantity of REs that are in the $i^{th}$ first sub-resource and that are used to transmit the data, and $i=0, 1, \ldots, N_{PSSCH}^{sub-ch}-1$.

$N_{SC}^{PRB}$ represents a quantity of subcarriers in a physical resource block PRB, $N_{sub-ch}^{PRB}$ represents a quantity of PRBs in the sub-channel, $N_{syml}^{sh'}$ represents a quantity of symbols in the first time unit that are available for encoding, $N_{syml}^{sh'}=N_{syml}^{sh}-1_{\alpha}$, $N_{syml}^{sh}$ represents a quantity of symbols in the first time unit, $1_{\alpha}$ represents a transport block adjustment factor, $N_{DMRS}^{i}$ represents a quantity of REs that are in the $i^{th}$ first sub-resource and that are used to transmit the data channel demodulation pilot, $N_{PSCCH}^{i}$ represents a sum of quantities of REs that are in the $i^{th}$ first sub-resource and that are used to transmit the control channel and the control channel demodulation pilot, and $N_{oh}$ represents a quantity of REs that are in the $i^{th}$ first sub-resource and that are used to transmit fifth sub-information, where the fifth sub-information includes the second-stage control information, the control channel, the control channel demodulation pilot, the PTRS, and the CSI-RS in the first information.

Optionally, the first time-frequency resource includes $N_{PSSCH}^{PRB}$ second sub-resources, the second sub-resource includes the first time unit in time domain and includes one physical resource block PRB in the data channel resource in frequency domain, and $N_{PSSCH}^{PRB}$ is a positive integer.

The determining, based on a quantity of resource elements REs that are in a first time-frequency resource and that are used to transmit first information, a quantity of REs that are in the first time-frequency resource and that are used to transmit data includes determining, based on a quantity of REs that are in each second sub-resource and that are used to transmit the first information, a quantity of REs that are in each second sub-resource and that are used to transmit the data.

A sum of quantities of REs that are in the $N_{PSSCH}^{PRB}$ second sub-resources and that are used to transmit the data is equal to the quantity of REs that are in the first time-frequency resource and that are used to transmit the data.

Optionally, a quantity of REs that are in an $i^{th}$ second sub-resource in the first time-frequency resource and that are used to transmit the data satisfies Formula (22):

$$N_{RE}^i = N_{SC}^{PRB} * N_{syml}^{sh'} - N_{DMRS}^i - N_{PSCCH}^i - N_{oh} \quad (22)$$

$N_{RE}^i$ represents a quantity of REs that are in the $i^{th}$ first sub-resource and that are used to transmit the data, $i=0, 1, \ldots, N_{PSSCH}^{PRB}-1$, $N_{SC}^{PRB}$ represents a quantity of subcarriers in a PRB, $N_{syml}^{sh'}$ represents a quantity of symbols in the first time unit that are available for encoding, $N_{syml}^{sh'} = N_{syml}^{sh} - 1_\alpha$, $N_{syml}^{sh}$ represents a quantity of symbols in the first time unit, $1_\alpha$ represents a transport block adjustment factor, $N_{DMRS}^i$ represents a quantity of REs that are in the $i^{th}$ second sub-resource and that are used to transmit the data channel demodulation pilot, $N_{PSCCH}^i$ represents a sum of quantities of REs that are in the $i^{th}$ second sub-resource and that are used to transmit the control channel and the control channel demodulation pilot, and $N_{oh}$ represents a quantity of REs that are in the $i^{th}$ second sub-resource and that are used to transmit fourth sub-information, where the fourth sub-information includes the second-stage control information, the PTRS, and/or the CSI-RS in the first information.

Optionally, when $0 \leq i < N_{PSCCH}^{PRB}$, $N_{PSCCH}^i = N_{SC}^{PRB} * N_{syml}^{PSCCH}$; or when $i \geq N_{PSCCH}^{PRB}$, $N_{PSCCH}^i = 0$.

$N_{PSCCH}^{PRB}$ represents a quantity of PRBs that are in the data channel resource and that are used to transmit the control channel, and $N_{syml}^{PSCCH}$ represents a quantity of symbols that are in the first time unit and that are used to transmit the control channel.

Optionally, a quantity of REs that are in an $i^{th}$ second sub-resource in the first time-frequency resource and that are used to transmit the data satisfies Formula (23):

$$N_{RE}^i = N_{SC}^{PRB} * N_{syml}^{sh'} - N_{DMRS}^i - N_{oh} \quad (23)$$

$N_{RE}^i$ represents the quantity of REs that are in the $i^{th}$ first sub-resource and that are used to transmit the data, and $i=0, 1, \ldots, N_{PSSCH}^{PRB}-1$.

$N_{SC}^{PRB}$ represents a quantity of subcarriers in a PRB, $N_{syml}^{sh'}$ represents a quantity of symbols in the first time unit that are available for encoding, $N_{syml}^{sh'} = N_{syml}^{sh} - 1_\alpha$, $N_{syml}^{sh}$ represents a quantity of symbols in the first time unit, $1_\alpha$ represents a transport block adjustment factor, $N_{DMRS}^i$ represents a quantity of REs that are in the $i^{th}$ second sub-resource and that are used to transmit a data channel demodulation pilot, $N_{PSCCH}^i$ represents a sum of quantities of REs that are in the $i^{th}$ second sub-resource and that are used to transmit the control channel and the control channel demodulation pilot, and $N_{oh}$ represents a quantity of REs that are in the $i^{th}$ first sub-resource and that are used to transmit fifth sub-information, where the fifth sub-information includes the second-stage control information, the control channel, the control channel demodulation pilot, the PTRS, and the CSI-RS in the first information.

The quantity of REs that are in the first time-frequency resource and that are used to transmit the data can be accurately determined in all the following optional manners.

According to a second aspect, a communication method is provided. The method may be applied to a network device. The method includes: sending indication information, where the indication information is used to indicate values of one or more of the following parameters: $N_{oh}$, $N_{oh\_SCI2}^{RRE}$, and $1_\alpha$.

$N_{oh}$ represents one of the following items in each first sub-resource or each second sub-resource, including a quantity of REs used to transmit a PTRS and/or a CSI-RS; a sum of quantities of REs used to transmit at least one of the following: a control channel, a control channel demodulation pilot, the PTRS, or the CSI-RS; a sum of quantities of REs used to transmit at least one of the following: second-stage control information, the PTRS, and the CSI-RS; or a sum of quantities of REs used to transmit at least one of the following: the second-stage control information, the control channel, the control channel demodulation pilot, the PTRS, and the CSI-RS.

$N_{oh\_SCI2}^{RE}$ represents a quantity of REs that are in a first time-frequency resource and that are used to transmit the second-stage control information.

$1_\alpha$ represents a transport block adjustment factor. For example, $1_\alpha$ specifically represents a quantity of symbols in a first time unit that are adjusted for calculating a transport block size of a data channel.

The first time-frequency resource includes the first time unit in time domain and includes a data channel resource in frequency domain. The first sub-resource includes the first time unit in time domain and includes one sub-channel in the data channel resource in frequency domain. The second sub-resource includes the first time unit in time domain and includes one PRB in the data channel resource in frequency domain.

According to the method provided in this application, a transmit-side terminal device and a receive-side terminal device may determine, based on indication information sent by a network device, a quantity of REs used to transmit sidelink data. Further, a transport block size of a sidelink may be determined based on the quantity of REs used to transmit the sidelink data.

According to a third aspect, a communication apparatus is provided. The communication apparatus includes modules or units configured to perform the method in any one of the first aspect or the possible implementations of the first aspect, or includes modules or units configured to perform the method in any one of the second aspect or the possible implementations of the second aspect.

According to a fourth aspect, a communication apparatus is provided. The communication apparatus includes a processor. The processor is coupled to a memory, and may be configured to execute instructions in the memory, to enable the apparatus to perform the method in any one of the first aspect or the possible implementations of the first aspect, or perform the method in any one of the second aspect or the possible implementations of the second aspect. Optionally, the apparatus further includes the memory. Optionally, the apparatus further includes an interface circuit, and the processor is coupled to the interface circuit.

According to a fifth aspect, a processor is provided. The processor includes an input circuit, an output circuit, and a processing circuit. The processing circuit is configured to receive a signal by using the input circuit, and transmit a signal by using the output circuit, to enable the processor to perform the method in any one of the first aspect or the possible implementations of the first aspect, or performs the method in any one of the second aspect or the possible implementations of the second aspect.

In a specific implementation process, the processor may be a chip, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and the various circuits are not limited in this embodiment of this application.

According to a sixth aspect, a communication apparatus is provided. The communication apparatus includes a processor and a memory. The processor is configured to: read instructions stored in the memory, receive a signal by using a receiver, and transmit a signal by using a transmitter, to perform the method in any one of the first aspect or the possible implementations of the first aspect, or perform the method in any one of the second aspect or the possible implementations of the second aspect.

Optionally, there are one or more processors, and there are one or more memories.

Optionally, the memory may be integrated with the processor, or the memory and the processor are disposed separately.

In a specific implementation process, the memory may be a non-transitory (non-transitory) memory, for example, a read-only memory (read only memory, ROM). The memory and the processor may be integrated into a same chip, or may be disposed on different chips. A type of the memory and a manner in which the memory and the processor are disposed are not limited in this embodiment of this application.

The processing apparatus in the sixth aspect may be a chip. The processor may be implemented by hardware or software. When the processor is implemented by hardware, the processor may be a logic circuit, an integrated circuit, or the like. When the processor is implemented by software, the processor may be a general-purpose processor, and is implemented by reading software code stored in the memory. The memory may be integrated with the processor, or may be independent of the processor.

According to a seventh aspect, a computer program product is provided. The computer program product includes a computer program (which may also be referred to as code or instructions). When the computer program is run, a computer is enabled to perform the method in any one of the first aspect or the possible implementations of the first aspect, or perform the method in any one of the second aspect or the possible implementations of the second aspect.

According to an eighth aspect, a computer-readable medium is provided. The computer-readable medium stores a computer program (which may also be referred to as code or instructions). When the computer program is run on a computer, the computer is enabled to perform the method in any one of the first aspect or the possible implementations of the first aspect, or perform the method in any one of the second aspect or the possible implementations of the second aspect.

DETAILED DESCRIPTION OF ILLUSTRATIVE EMBODIMENTS

Figure 1:
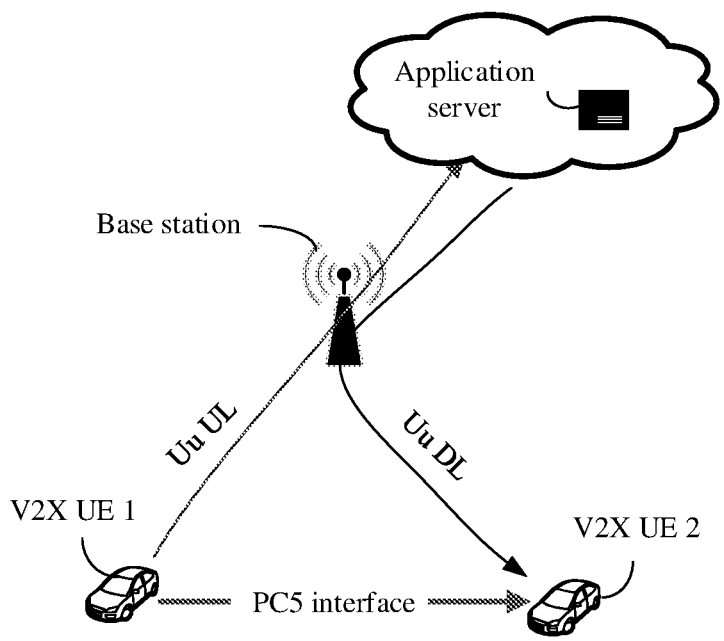
FIG. 1 is a schematic diagram of a V2X communication architecture according to this application.

The following describes technical solutions in this application with reference to accompanying drawings.

The technical solutions provided in this application may be applied to a device to device (device to device, D2D) scenario, and optionally, may be applied to a vehicle to everything (vehicle to everything, V2X) scenario. For example, the V2X scenario may be specifically any one of the following systems: vehicle to vehicle (vehicle to vehicle, V2V) communication, vehicle to pedestrian (vehicle to pedestrian, V2P) communication, a vehicle to network (vehicle to network, V2N) service, and vehicle to infrastructure (vehicle to infrastructure, V2I) communication.

For example, D2D may be long term evolution (long term evolution, LTE) D2D or new radio (new radio, NR) D2D, or may be D2D in another communication system that may appear as technologies develop. Similarly, V2X may be LTE V2X or NR V2X, or may be V2X in another communication system that may appear as technologies develop.

A terminal device in embodiments of this application may be user equipment, an access terminal, a subscriber unit, a subscriber station, a mobile station, a remote station, a remote terminal, a mobile device, a user terminal, a terminal, a wireless communication device, a user agent, or a user apparatus. The terminal device may alternatively be a cellular phone, a cordless phone, a session initiation protocol (session initiation protocol, SIP) phone, a wireless local loop (wireless local loop, WLL) station, a personal digital assistant (personal digital assistant, PDA), a handheld device having a wireless communication function, a computing device, another processing device connected to a wireless modem, a vehicle-mounted device, a wearable device, a terminal device in a future 5G network, a terminal device in a future evolved public land mobile network (public land mobile network, PLMN), or the like. This is not limited in embodiments of this application.

The network device in embodiments of this application may be a base station (base station), an evolved NodeB (evolved NodeB, eNodeB), a transmission reception point (transmission reception point, TRP), a next generation NodeB (next generation NodeB, gNB) in a 5G mobile communication system, a base station in a future mobile communication system, an access node in a Wi-Fi system, or the like; or the network device may be a module or a unit that implements a part of functions of a base station, for example, may be a central unit (central unit, CU), or a distributed unit (distributed unit, DU). A specific technology and a specific device form that are used by the network device are not limited in embodiments of this application.

In embodiments of this application, the terminal device or the network device includes a hardware layer, an operating system layer running above the hardware layer, and an application layer running above the operating system layer. The hardware layer includes hardware such as a central processing unit (central processing unit, CPU), a memory management unit (memory management unit, MMU), and a memory (also referred to as a main memory). The operating system may be any one or more computer operating systems that implement service processing through a process (process), for example, a Linux operating system, a Unix operating system, an Android operating system, an iOS operating system, or a Windows operating system. The application layer includes applications such as a browser, a contact list, word processing software, and instant messaging software. In addition, a specific structure of an execution body of a method provided in embodiments of this application is not specifically limited in embodiments of this application provided that a program that records code for the method provided in embodiments of this application can be run to perform communication according to the method provided in embodiments of this application. For example, the method provided in embodiments of this application may be performed by the terminal device or the network device, or may be performed by a functional module that is in the terminal device or the network device and that can invoke and execute a program.

In addition, aspects or features of this application may be implemented as a method, an apparatus, or a product that uses standard programming and/or engineering technologies. The term "product" used in this application covers a computer program that can be accessed from any computer-readable component, carrier, or medium. For example, a computer-readable medium may include but is not limited to: a magnetic storage component (for example, a hard disk, a floppy disk, or a magnetic tape), an optical disc (for example, a compact disc (compact disc, CD) or a digital versatile disc (digital versatile disc, DVD)), a smart card and a flash memory component (for example, an erasable programmable read-only memory (erasable programmable read-only memory, EPROM), a card, a stick, or a key drive). In addition, various storage media described in this specification may indicate one or more devices and/or other machine-readable media that are configured to store information. The term "machine-readable media" may include but is not limited to a wireless channel, and various other media that can store, include, and/or carry instructions and/or data.

FIG. 1 is a schematic diagram of a V2X communication architecture. As shown in FIG. 1, the architecture includes two types of communication interfaces: a PC5 interface and a Uu interface. The PC5 interface is a direct communication interface between V2X UEs (for example, V2X UE 1 and V2X UE 2 shown in the figure). A direct communication link between V2X UEs is also defined as a sidelink or a sidelink (sidelink, SL). Uu interface communication is a communication mode in which a transmitter V2X UE (for example, V2X UE 1) sends V2X data to a base station through the Uu interface, the base station sends the data to a V2X application server for processing, the V2X application server delivers processed data to a base station, and then the base station sends the data to a receiver V2X UE (for example, V2X UE 2). In the Uu interface communication mode, a base station that forwards uplink data of the transmitter V2X UE to the application server and a base station that forwards downlink data delivered by the application server to the receiver V2X UE may be a same base station, or may be different base stations. This may be specifically determined by the application server. It should be understood that sending performed by the transmitter V2X UE to the base station is referred to as uplink (uplink, UL) transmission, and sending performed by the base station to the receiver V2X UE is referred to as downlink (downlink, DL) transmission.

Figure 2:
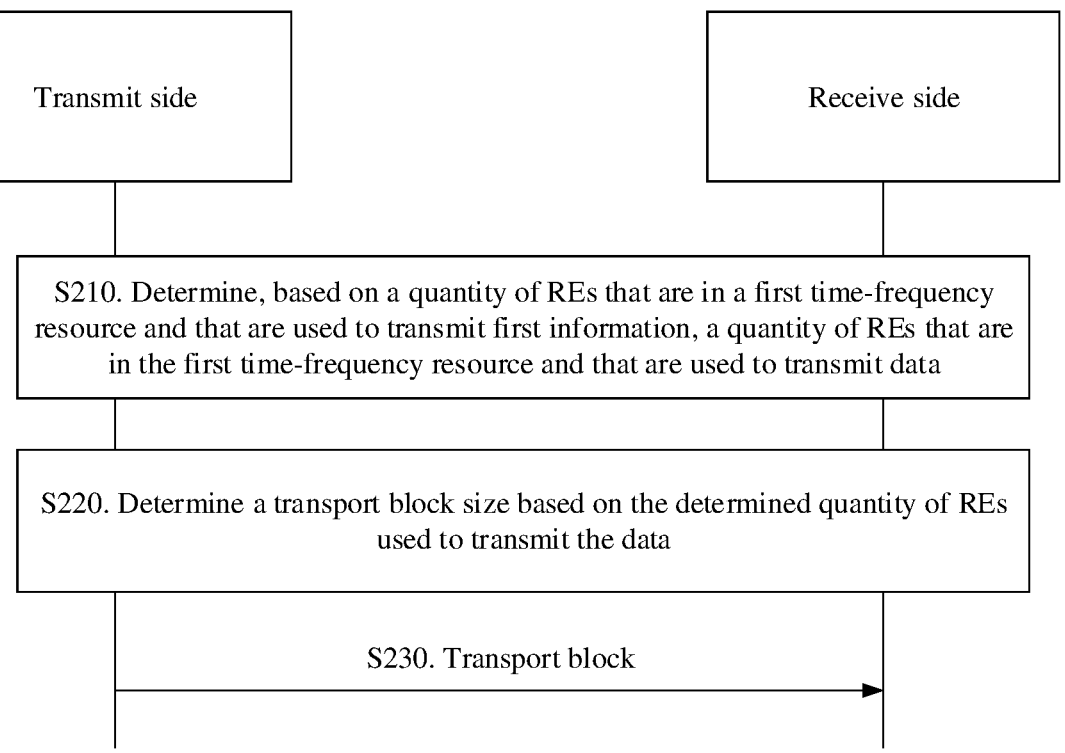
FIG. 2 is a schematic flowchart of a communication method according to this application.

The following describes a communication method provided in this application with reference to FIG. 2. The following describes steps in the method 200.

S210. Determine, based on a quantity of REs that are in a first time-frequency resource and that are used to transmit first information, a quantity of REs that are in the first time-frequency resource and that are used to transmit data.

The first time-frequency resource includes a first time unit in time domain and includes a data channel resource in frequency domain. Alternatively, the first time-frequency resource is formed by a first time unit and a data channel resource. It should be understood that the first time unit is a time domain resource, and the data channel resource is a frequency domain resource.

In a possible example, the data channel resource is a bandwidth occupied by a data channel, and the bandwidth may be indicated on a control channel.

The first time unit may include symbols other than the first symbol and the last symbol in a sidelink communication slot (for example, the sidelink communication slot may be referred to as a sidelink communication slot, or a sidelink slot). For example, if one sidelink communication slot includes 14 orthogonal frequency division multiplexing (orthogonal frequency division multiplexing) symbols, the first time unit includes 12 OFDM symbols. It should be understood that the first time unit is used for sidelink communication.

For example, the first symbol in the sidelink communication slot may be used for automatic gain control (automatic gain control, AGC), and the last symbol is a gap (GAP) symbol.

In V2X, to avoid impact on a decoding effect of the control channel, the first symbol needs to be set as an AGC symbol, and data mapped to the first symbol is copied from a symbol immediately adjacent to the AGC symbol, namely, the second valid symbol.

The data channel resource is used for sidelink communication. The data channel resource may include several sub-channels (sub-channels).

The data channel resource is a resource in a resource set. The resource set may also be referred to as a resource pool. The resource pool may be configured by a network device, or the resource pool may be preconfigured (that is, specified in a protocol). The resource pool may include a plurality of sub-channels, each sub-channel includes a plurality of consecutive PRBs, and the data channel resource may include one or more consecutive sub-channels.

It should be noted that a resource pool in the following is a resource pool corresponding to the data channel resource. However, this application is not limited thereto.

The first information includes one or more of the following: the control channel, a control channel demodulation pilot, a data channel demodulation pilot, second-stage control information, a phase tracking reference signal PTRS, and a channel state information reference signal CSI-RS.

For example, if the PTRS needs to be transmitted on the first time-frequency resource, the first information includes the PTRS; or if the PTRS does not need to be transmitted on the first time-frequency resource, the first information does not include the PTRS. Alternatively, if it is configured that the PTRS can be sent in a resource pool of a sidelink, the first information includes the PTRS. If no PTRS is configured in a resource pool of a sidelink, the first information does not include the PTRS. Similarly, if the CSI-RS needs to be transmitted on the first time-frequency resource, the first information includes the CSI-RS; or if the CSI-RS does not need to be transmitted on the first time-frequency resource, the first information does not include the CSI-RS. Alternatively, if it is configured that the CSI-RS can be sent in a resource pool of a sidelink, the first information includes the CSI-RS. If no CSI-RS is configured in a resource pool of a sidelink, the first information does not include the CSI-RS.

The control channel is a control channel used for sidelink communication. For example, the control channel may be a physical sidelink control channel (physical sidelink control channel, PSCCH).

The control channel demodulation pilot is a pilot used to demodulate the control channel, and may be, for example, a control channel demodulation reference signal (demodulation reference signal, DMRS).

The data channel demodulation pilot is a pilot used to demodulate the control channel, and may be, for example, a data channel DMRS. The data channel in this application is a data channel for sidelink communication, and may be, for example, a physical sidelink shared channel (physical sidelink shared channel, PSSCH).

The second-stage control information is control information transmitted through the data channel, and may be, for example, sidelink control information (sidelink control information) SCI2, or SCI0 to SCI2 in an NR-V2X system.

In this application, the data is data transmitted on the sidelink.

Figure 3:
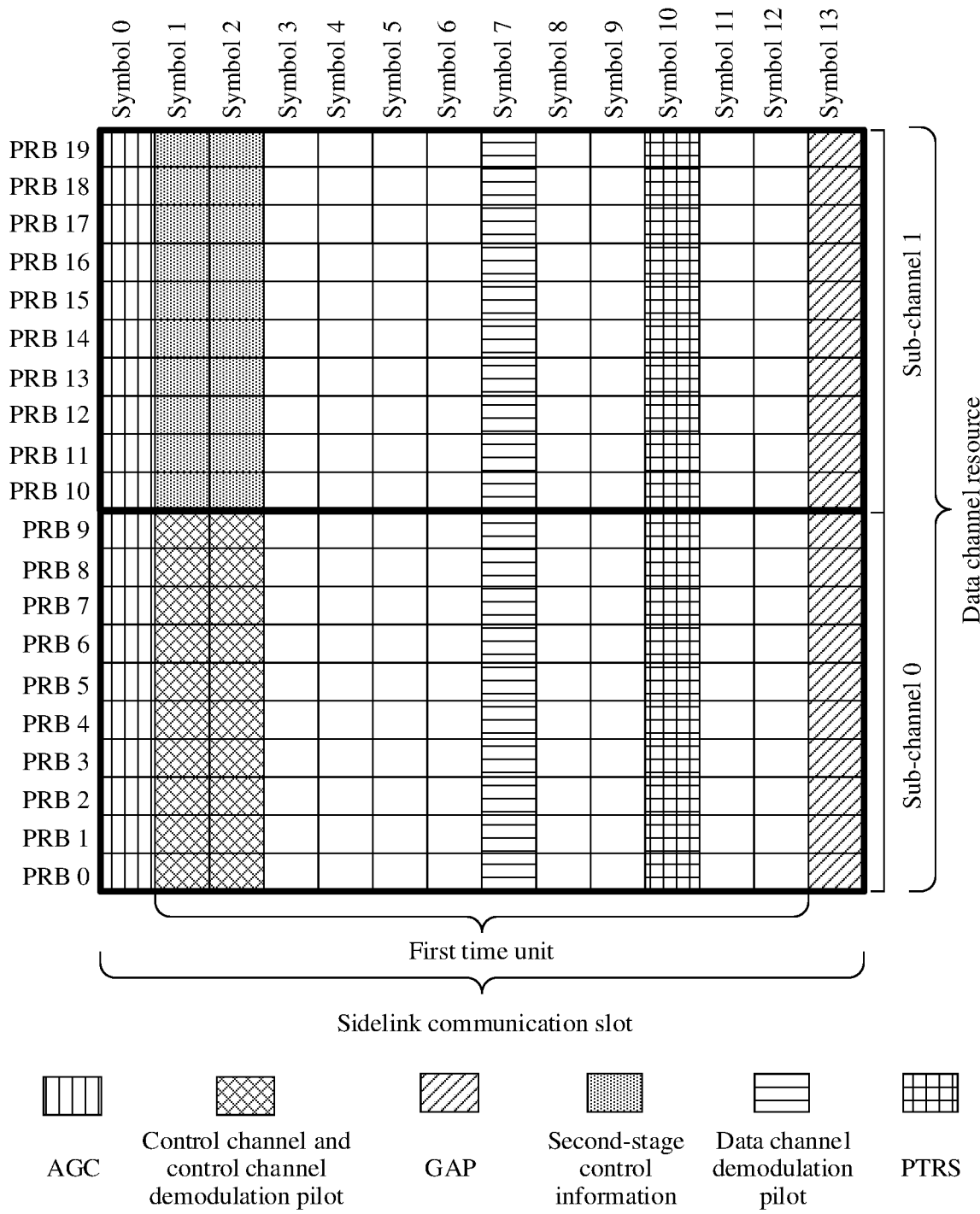
FIG. 3 is a schematic diagram of relative positions of a first time-frequency resource, a time-frequency resource used to transmit first information, and a time-frequency resource used to transmit data.

For example, FIG. 3 is a schematic diagram of relative positions of the first time-frequency resource, a time-frequency resource used to transmit the first information, and a time-frequency resource used to transmit the data.

As shown in FIG. 3, the first time-frequency resource is formed by 12 symbols and 20 PRBs. In other words, the first time-frequency resource is formed by 12 symbols and two sub-channels (sub-channels 0 and 1), and one sub-channel includes 10 PRBs. One sidelink communication slot includes 14 symbols, namely, symbol 0 to symbol 13. The first time unit includes symbol 1 to symbol 12. Symbol 0 is used for AGC, and symbol 13 is used as a GAP. The data channel resource includes 20 PRBs, namely, PRB 0 to PRB 19. A time-frequency resource formed by symbols 0 and 1 and PRBs 0 to 9 is used to transmit the control channel and the control channel demodulation pilot in the first information. A time-frequency resource formed by symbols 0 and 1 and PRBs 10 to 19 is used to transmit the second-stage control information. A time-frequency resource formed by symbol 7 and PRBs 0 to 19 is used to transmit the data channel demodulation pilot. If the resource shown in FIG. 3 is not used to transmit the PTRS and the CSI-RS, a resource that is not padded with a pattern in the figure may be used to transmit the data. It should be understood that the resource shown in FIG. 3 may also be used to transmit the PTRS and/or the CSI-RS.

It should be understood that FIG. 3 is merely an example, and a position of each piece of information shown in the figure and a size of an occupied resource should not constitute any limitation on this application.

It should be noted that step S210 is applicable to both a transmit-side terminal device and a receive-side terminal device. The transmit-side terminal device and the receive-side terminal device are two ends that communicate with each other through a sidelink. For example, when the method 200 is applied to the system shown in FIG. 1, the transmit-side terminal device may be V2X UE 1, and the receive-side terminal device may be V2X UE 2.

Optionally, the method may further include the following step.

S220. Determine a transport block size based on the determined quantity of REs used to transmit the data.

Step S220 is applicable to both the transmit-side terminal device and the receive-side terminal device.

It should be understood that, in this application, whether the receive-side terminal device first performs S210 and S220 or the transmit-side terminal device first performs S210 and S220 is not limited, provided that the transmit-side terminal device can determine the transport block size before sending a transport block, and the receive-side terminal device can determine the transport block size before performing channel decoding on the transport block.

S230. The transmit-side sends the transport block based on the transport block size. Correspondingly, the receive-side receives the transport block based on the transport block size. That is, the receive-side terminal device performs channel decoding on the transport block.

According to the method provided in this application, a quantity of REs used to transmit sidelink data may be determined based on quantities of REs used to transmit the control channel, the control channel demodulation pilot, the data channel demodulation pilot, the second-stage control information, the CSI-RS, and/or the PTRS. Further, a TBS of the sidelink may be determined based on the quantity of REs used to transmit the sidelink data.

The following describes a specific implementation of S210.

First, for ease of understanding and brief description, the following definitions are provided in this application:

(1) A quantity of sub-channels included in the data channel resource is $N_{PSSCH}^{sub-ch}$.

For example, in FIG. 3, $N_{PSSCH}^{sub-ch}=2$.

$N_{PSSCH}^{sub-ch}$ may be configured by the network device or determined by the transmit-side terminal device.

In this application, $N_{PSSCH}^{sub-ch}$ is configured by the network device (for example, the base station shown in FIG. 1), and may be delivered by the network device to the transmit-side terminal device through a downlink control channel; or may be configured by the network device and delivered to the transmit-side terminal device by using higher layer signaling. The higher layer signaling may be RRC signaling. This is not limited in this application. For example, the higher layer signaling may alternatively be a MAC CE. $N_{PSSCH}^{sub-ch}$ is configured by the transmit-side terminal device, or may be configured by the transmit-side terminal device based on a resource selection result and sent to a physical layer by using an inter-layer primitive, to perform a corresponding encoding operation.

(2) A quantity of PRBs included in the data channel resource is $N_{PSSCH}^{PRB}$.

For example, in FIG. 3, $N_{PSSCH}^{PRB}=20$.

(3) A quantity of symbols in the first time unit that are available for encoding is $N_{syml}^{sh'}$.

$$N_{syml}^{sh'}=N_{syml}^{sh}-l_\alpha$$

$N_{syml}^{sh}$ represents the quantity of symbols in the first time unit. For example, in FIG. 3, $N_{syml}^{sh}=12$.

$l_\alpha$ represents a transport block adjustment factor. For example, $l_\alpha$ specifically represents a quantity of symbols in the first time unit that are adjusted for calculating a transport block size of the data channel.

For example, if no PSFCH transmission resource is configured in the resource pool, in other words, if no sidelink transmission slot has a symbol used to transmit a PSFCH, $l_\alpha=0$. Therefore, $N_{syml}^{sh'}=N_{syml}^{sh}$.

Figure 4:
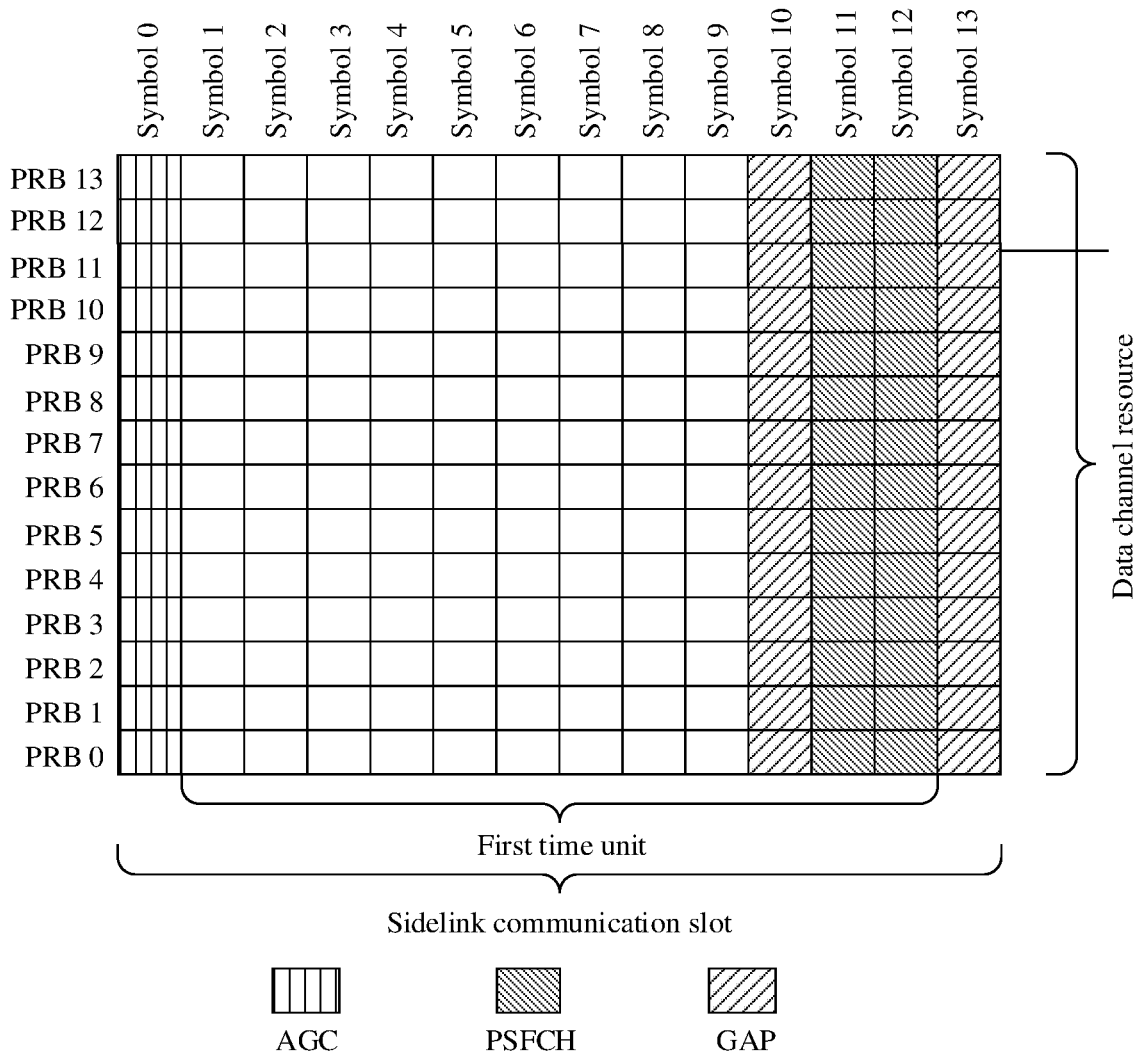
FIG. 4 is a structural diagram of a slot according to this application.

For example, if a PSFCH transmission resource is configured in the resource pool, to be specific, some sidelink transmission slots have symbols used to transmit the PSFCH, some sidelink transmission slots do not have a symbol used to transmit the PSFCH, and for example, a sidelink transmission slot is that shown in FIG. 4, $l_\alpha$ may not be 0. A specific value of $l_\alpha$ may be configured by a system, or may be indicated by the transmit-side terminal device to the receive-side terminal device.

For example, if $l_\alpha=3$, $N_{syml}^{sh'}=9$. For example, in FIG. 4, the symbols in the first time unit that are available for encoding are symbols 1 to 9.

(4) A first sub-resource includes the first time unit in time domain and includes one sub-channel in the data channel resource in frequency domain.

In other words, one sub-resource is formed by the first time unit and one sub-channel in the data channel resource.

It may be understood that a quantity of first sub-resources included in the first time-frequency resource is $N_{PSSCH}^{sub-ch}$.

(5) A second sub-resource includes the first time unit in time domain and includes one PRB in the data channel resource in frequency domain.

It may be understood that a quantity of second sub-resources included in the first time-frequency resource is $N_{PSSCH}^{PRB}$.

(6) First sub-information includes the control channel, the control channel demodulation pilot, and the second-stage control information in the first information.

(7) Second sub-information includes at least one of the following: the data channel demodulation pilot, the PTRS, or the CSI-RS.

The first information includes the first sub-information and the second sub-information, and the second sub-information includes information other than the first sub-information in the first information.

The following specifically describes various manners of S210.

Manner 1

The manner includes: determining, based on a quantity of REs that are in each first sub-resource and that are used to transmit the second sub-information, a sum of quantities of REs that are in each first sub-resource and that are used to transmit the data and the first sub-information; and determining, based on the sum of the quantities of REs that are in each first sub-resource and that are used to transmit the data and the first sub-information, and a quantity of REs that are in the first time-frequency resource and that are used to transmit the first sub-information, the quantity of REs that are in the first time-frequency resource and that are used to transmit the data.

For example, a sum of quantities of REs that are in an $i^{th}$ first sub-resource and that are used to transmit the data and the first sub-information satisfies Formula (1):

$$N'_{RE,i}=N_{SC}^{PRB}*N_{sub-ch}^{PRB}*N_{syml}^{sh'}-N_{DMRS}^{i}-N_{oh} \qquad (1)$$

$N'_{RE,i}$ represents the sum of the quantities of REs that are in the $i^{th}$ first sub-resource and that are used to transmit the data and the first sub-information, and $i=0, 1, \ldots, N_{PSSCH}^{sub-ch}-1$.

$N_{SC}^{PRB}$ represents a quantity of subcarriers in a physical resource block PRB.

In this application, $N_{SC}^{PRB}=12$. However, this is not limited in this application.

$N_{sub-ch}^{PRB}$ represents a quantity of PRBs in a sub-channel. For example, in FIG. 3, $N_{sub-ch}^{PRB}=10$.

$N_{DMRS}^{i}$ represents a quantity of REs that are in the $i^{th}$ first sub-resource and that are used to transmit the data channel demodulation pilot.

$N_{oh}$ includes a sum of quantities of REs that are in the $i^{th}$ first sub-resource and that are used to transmit the PTRS and/or the CSI-RS. In other words, $N_{oh}$ is a quantity of REs that are configured for each first sub-resource and that are used to transmit the PTRS and/or the CSI-RS.

It should be understood that, if the PTRS needs to be transmitted, $N_{oh}$ includes the quantity of REs used to transmit the PTRS; or if the PTRS does not need to be transmitted, $N_{oh}$ includes a quantity of REs not used to transmit the PTRS, or in other words, the quantity of REs used to transmit the PTRS is 0. If the CSI-RS needs to be transmitted, $N_{oh}$ includes the quantity of REs used to transmit the CSI-RS; or if the CSI-RS does not need to be transmitted, $N_{oh}$ includes a quantity of REs not used to transmit the CSI-RS, or in other words, the quantity of REs used to transmit the CSI-RS is 0.

In this application, $N_{oh}$ may be preconfigured in the resource pool, or may be configured by the network device in the resource pool. $N_{oh}$ in the following may also be configured in the two manners. Details are not described below.

For example, the quantity of REs that are in the first time-frequency resource and that are used to transmit the data satisfies Formula (2):

$$N_{RE}=\Sigma_{i=0}^{N_{PSSCH}^{sub-ch}-1}N'_{RE,i}-N_{PSCCH}^{RE}-N_{oh\_SCI2}^{RE} \qquad (2)$$

$N_{RE}$ represents the quantity of REs that are in the first time-frequency resource and that are used to transmit the data.

$N_{PSCCH}^{RE}$ represents a sum of quantities of REs that are in the first time-frequency resource and that are used to transmit the control channel and the control channel demodulation pilot in the first sub-information.

$N_{oh\_SCI2}^{RE}$ represents a quantity of REs that are in the first time-frequency resource and that are used to transmit the second-stage control information in the first sub-information.

It should be understood that, if Formula (1) is substituted into Formula (2), Formula (2) is changed into Formula (2a) below:

$$N_{RE}=\Sigma_{i=0}^{N_{PSSCH}^{sub-ch}-1}(N_{SC}^{PRB}*N_{sub-ch}^{PRB}*N_{syml}^{sh'}- N_{DMRS}^{i}-N_{oh})-N_{PSCCH}^{RE}-N_{oh\_SCI2}^{RE} \qquad (2a)$$

Optionally, $N_{PSCCH}^{RE}$ satisfies Formula (3):

$$N_{PSCCH}^{RE}=N_{sc}^{PRB}*N_{syml}^{PSCCH}*N_{PSCCH}^{PRB} \qquad (3)$$

$N_{syml}^{PSCCH}$ represents a quantity of symbols that are in the first time unit and that are used to transmit the control channel. $N_{PSCCH}^{PRB}$ represents a quantity of PRBs that are in the data channel resource and that are used to transmit the control channel. FIG. 3 is used as an example. Assuming that the control channel demodulation pilot occupies only some REs in a time-frequency resource formed by symbol 1 and PRB 2, $N_{syml}^{PSCCH}=2$ and $N_{PSCCH}^{PRB}=10$.

The following describes possible calculation methods of $N_{oh\_SCI2}^{RE}$.

Calculation Method 1

$N_{oh\_SCI2}^{RE}$ satisfies Formula (4):

$$N_{oh\_SCI2}^{RE} = \min\left\{\left\lceil\frac{(O_{SCI2}+L_{SCI2})*\overline{\beta}}{R*Q_m}\right\rceil, \left\lceil\alpha\sum_{l=0}^{N_{syml}^{sh}-1}M_{sc}^{SCI2}(l)\right\rceil\right\}+\gamma \qquad (4)$$

$O_{SCI2}$ represents a valid payload size of the second-stage control information, $L_{SCI2}$ represents a cyclic redundancy check CRC bit length of the second-stage control information, R represents a bit rate of a data channel, $Q_m$ represents a modulation order of the data channel, $\bar{\beta}$ represents an equivalent scale factor of a bit rate of the second-stage control information, $M_{sc}^{SCI2}(l)$ represents a quantity of REs that are in a time-frequency resource formed by symbol l in the first time unit and the data channel resource and that are used to transmit the second-stage control information, $\alpha$ represents a scale factor of a resource used to transmit the second-stage control information, and $\gamma$ represents a quantity of REs that is defined to satisfy that the second-stage control information occupies an integer quantity of PRBs.

It should be understood that symbol l herein may be understood as an $l^{th}$ symbol in the first time unit. For example, when l=0, symbol l corresponds to symbol 1 in FIG. 4, when l=1, symbol l corresponds to symbol 2 in FIG. 4, and so on.

For example, $\alpha$ may be preconfigured in the resource pool, or may be configured by the network device in the resource pool.

In a possible example, $\bar{\beta}$ satisfies Formula (4a) or (4b):

$$\bar{\beta} = \beta_{offset}^{SCI2} \tag{4a}$$

$$\bar{\beta} = \frac{1}{M}\sum_{q=0}^{M-1} \beta_{offset,q}^{SCI2} \tag{4b}$$

$\beta_{offset}^{SCI2}$ represents a scale factor of a bit rate of the second-stage control information, $\beta_{offset,q}^{SCI2}$ represents a $q^{th}$ scale factor in M scale factors configured in a resource pool to which the data channel resource belongs, and the scale factor is the scale factor of the bit rate of the second-stage control information. $\beta_{offset,q}^{SCI2}$ may be preconfigured in the resource pool, or may be configured by the network device in the resource pool.

In a possible example, $M_{sc}^{SCI2}(l)$ is determined based on at least one of the following, including a quantity of subcarriers occupied by the data channel pilot on symbol l in the first time unit, a quantity of subcarriers occupied by the PTRS on symbol l in the first time unit, a quantity of subcarriers occupied by the CSI-RS on symbol l in the first time unit, and a quantity of subcarriers occupied by the control channel on symbol l in the first time unit.

For example, when $M_{sc}^{SCI2}(l)$ is determined based on the quantities of subcarriers occupied by the data channel pilot, the PTRS, the CSI-RS, and the control channel on symbol l in the first time unit, $M_{sc}^{SCI2}(l)$ satisfies Formula (4c):

$$M_{sc}^{SCI2}(l)=M_{sc}^{PSSCH}(l)-M_{sc}^{DMRS}(l)-M_{sc}^{PTRS}(l)-M_{sc}^{CSI-RS}(l)-M_{sc}^{PSCCH}(l) \tag{4c}$$

$M_{sc}^{PSSCH}(l)$ is a quantity of subcarriers in a data channel scheduling bandwidth, $M_{sc}^{DMRS}(l)$ is the quantity of subcarriers occupied by the data channel pilot on symbol l, $M_{sc}^{PTRS}(l)$ is the quantity of subcarriers occupied by the PTRS on symbol l, $M_{sc}^{CSI-RS}(l)$ is the quantity of subcarriers occupied by the CSI-RS on symbol l, and $M_{sc}^{PSCCH}(l)$ is the quantity of subcarriers occupied by the control channel on the symbol.

It should be understood that, when $M_{sc}^{SCI2}(l)$ is not related to one or more of the quantities of subcarriers occupied by the data channel pilot, the PTRS, the CSI-RS, or the control channel on symbol l, $M_{sc}^{SCI2}(l)$ may be obtained by removing a corresponding parameter from Formula (4c).

For example, when $M_{sc}^{SCI2}(l)$ is determined based on the quantities of subcarriers occupied by the data channel pilot, the PTRS, and the control channel on symbol l, $M_{sc}^{SCI2}(l)$ satisfies Formula (4d):

$$M_{sc}^{SCI2}(l)=M_{sc}^{PSSCH}(l)-M_{sc}^{DMRS}(l)-M_{sc}^{PT-RS}(l)-M_{sc}^{PSCCH}(l) \tag{4d}$$

When $M_{sc}^{SCI2}(l)$ is determined based on the quantity of subcarriers occupied by the control channel on symbol l, $M_{sc}^{SCI2}(l)$ satisfies Formula (4e):

$$M_{sc}^{SCI2}(l)=M_{sc}^{PSSCH}(l)-M_{sc}^{PSCCH}(l) \tag{4e}$$

It should be understood that any one of Formulas (4a) to (4e) may be substituted into Formula (4) to obtain equivalent variations of Formula (4), and these equivalent variations shall fall within the protection scope of this application.

Optionally, considering that quantities of subcarriers in the data channel scheduling bandwidth on all symbols are the same, $M_{sc}^{PSSCH}(l)$ may be represented as $M_{sc}^{PSSCH}$. In addition, on symbol i to which the control channel is not mapped, $M_{sc}^{PSSCH}(l)=0$. On symbol l to which the control channel is mapped, a quantity of included subcarriers of the control channel is the same. To be specific, on symbol i to which the control channel is mapped, $M_{sc}^{PSSCH}(l)=M_{sc}^{P}-{sccH}M_{sc}^{PSSCH}$ is a quantity that is of subcarriers available for the data channel in frequency domain and that is configured by higher layer RRC. In this case, Formula (3) is transformed into Formula (5).

$$N_{oh\_SCI2}^{RE} = \tag{5}$$
$$\min\left\{\left\lceil\frac{(O_{SCI2} + L_{SCI2})*\bar{\beta}}{R*Q_m}\right\rceil, \alpha\left(N_{syml}^{sh} * M_{sc}^{PSSCH} - N_{syml}^{PSCCH} * M_{sc}^{PSCCH}\right)\right\} + \gamma$$

$N_{syml}^{PSCCH}$ is a quantity that is of symbols available for the control channel in time domain and that is configured by a higher layer. For meanings of other parameters, refer to the foregoing descriptions of the corresponding parameters.

Calculation Method 2

Optionally, $N_{oh\_SCI2}^{RE}$ satisfies Formula (6):

$$N_{oh\_SCI2}^{RE} = \frac{1}{M}\sum_{q=0}^{M-1} \ddot{N}_{oh\_SCI2,\beta_{offset,q}^{SCI2}}^{RE} \tag{6}$$

$$\ddot{N}_{oh\_SCI2,\beta_{offset,q}^{SCI2}}^{RE} = \tag{6a}$$
$$\min\left\{\left\lceil\frac{(O_{SCI2} + L_{SCI2})*\beta_{offset,q}^{SCI2}}{R*Q_m}\right\rceil, \left\lceil\alpha \cdot \sum_{l=0}^{N_{syml}^{sh}-1} M_{sc}^{SCI2}(l)\right\rceil\right\} + \gamma$$

$O_{SCI2}$ represents a valid payload size of the second-stage control information, $L_{SCI2}$ represents a CRC bit length of the second-stage control information, R represents a bit rate of a data channel, $Q_m$ represents a modulation order of the data channel, $N_{syml}^{sh}$ represents a quantity of symbols in the first time unit, $M_{sc}^{SCI2}(l)$ represents a quantity of REs that are in a time-frequency resource formed by symbol l in the first time unit and the data channel resource and that are used to transmit the second-stage control information, $\alpha$ represents a scale factor of a resource used to transmit the second-stage control information, $\gamma$ represents a quantity of REs that is defined to satisfy that the second-stage control information occupies an integer quantity of PRBs, $\beta_{offset,q}^{SCI2}$ represents a $q^{th}$ scale factor in M scale factors configured in a resource pool to which the data channel resource belongs, and the scale factor is a scale factor of a bit rate of the second-stage control information.

It should be understood that symbol l herein may be understood as an $l^{th}$ symbol in the first time unit. For example, when l=0, symbol l corresponds to symbol 1 in FIG. 4, when l=1, symbol l corresponds to symbol 2 in FIG. 4, and so on.

It should be further understood that α, γ, and $\beta_{offset,q}^{SCI2}$ described herein and below may be preconfigured in the resource pool, or may be configured by the network device in the resource pool. α may also be understood as a factor of a ratio of a maximum quantity of resources that are allowed to be used by the second-stage control information to a quantity of data channel resources.

It should be further understood that the calculation formula of $M_{sc}^{SCI2}(l)$ listed in Calculation method 1 is also applicable to Formula (6). The calculation formulas of $M_{sc}^{SCI2}(l)$ listed in Calculation method 1 may be substituted into Formula (6a) to obtain equivalent variations of Formula (6a), and these equivalent variations shall fall within the protection scope of this application. Similarly, Formula (6a) and an equivalent variation of Formula (6a) are substituted into Formula (6) to obtain equivalent variations of Formula (6), and these equivalent variations shall also fall within the protection scope of this application.

Calculation Method 3

Considering that the second-stage control information avoids a reference signal such as a DMRS/PRRS/CSI-RS during mapping, and γ ensures that no other information other than the second-stage control information and the reference signal is mapped to an RB to which the second-stage control information is mapped, mapping of the reference signal such as the DMRS/PRRS/CSI-RS actually affects a quantity of REs actually occupied by the second-stage control information. Therefore, when a mapping position of the reference signal such as the DMRS/PRRS/CSI-RS changes in an initial transmission process and a retransmission process of a data packet, to avoid impact on a calculation result of the second-stage control information, an upper limit of the quantity of REs and expressions of γ in the formulas may be modified.

Optionally, $N_{oh\_SCI2}^{RE}$ satisfies Formula (7):

$$N_{oh\_SCI2}^{RE} = \min\left\{\left\lceil \frac{(O_{SCI2} + L_{SCI2}) * \bar{\beta}}{R * Q} \right\rceil, N_{SCI2}^{bound}\right\} + \gamma \quad (7)$$

$O_{SCI2}$ represents a valid payload size of the second-stage control information, $L_{SCI2}$ represents a cyclic redundancy check CRC bit length of the second-stage control information, R represents a bit rate of a data channel, Q may represent a modulation order of the data channel or the control channel, $\bar{\beta}$ represents an equivalent scale factor of a bit rate of the second-stage control information, and has a specific meaning the same as that described above, or represents a scale factor that is of a resource for the second-stage control information and that is indicated by the first control information, $N_{SCI2}^{bound}$ represents an upper limit of a quantity of REs occupied by the second-stage control information, and γ represents a quantity of REs that is defined to satisfy that the second-stage control information occupies an integer quantity of PRBs.

Calculation Method 4

Based on Formula (7), a limitation of γ can be excluded, that is, $N_{oh\_SCI2}^{RE}$ satisfies Formula (8):

$$N_{oh\_SCI2}^{RE} = \min\left\{\left\lceil \frac{(O_{SCI2} + L_{SCI2}) * \bar{\beta}}{R * Q} \right\rceil, N_{SCI2}^{bound}\right\} \quad (8)$$

Calculation Method 5

Further, considering that the data channel may be mapped to two spatial layers, and the scale factor β of the bit rate of the second-stage control information is defined as scale ratios of the control channel and the data channel on each layer, a quantity of spatial layers to which the data channel is mapped needs to be considered when the REs occupied by the second-stage control channel are calculated.

$N_{oh\_SCI2}^{RE}$ satisfies Formula (9) or Formula (10):

$$N_{oh\_SCI2}^{RE} = \min\left\{\left\lceil \frac{(O_{SCI2} + L_{SCI2}) * \bar{\beta}}{v * R * Q} \right\rceil, N_{SCI2}^{bound}\right\} + \gamma \quad (9)$$

$$N_{oh\_SCI2}^{RE} = \min\left\{\left\lceil \frac{(O_{SCI2} + L_{SCI2}) * \bar{\beta}}{v * R * Q} \right\rceil, N_{SCI2}^{bound}\right\} \quad (10)$$

v represents the quantity of spatial layers of the data channel.

The foregoing calculation formula of $N_{oh\_SCI2}^{RE}$ may also be applied to determining a quantity of modulation symbols correspondingly output based on an encoding rate of the second-stage control information.

In a possible example, to avoid impact of a reference signal in a TBS determining process, a value of γ may be defined as 0, 3, 6, or 9; or γ is a preconfigured integer from 0 to 11, that is, γ may be any value in a set {0,1,2,3,4,5,6,7,8,9,10,11}.

In a possible example, considering a receiving capability of a terminal device, $N_{SCI2}^{bound}$ is a preconfigured fixed value P. P is a positive integer, where for example, P is 1024, 1536, or 2048; or P is a preconfigured maximum encoding or decoding capability of control information of the terminal device. In a possible example, without considering resources occupied by the control channel, $N_{SCI2}^{bound}$ may be defined as a part of a sum of quantities of REs in the data channel scheduling bandwidth, that is, $N_{SCI2}^{bound}$ satisfies Formula (11):

$$N_{SCI2}^{bound} = \left\lceil \alpha \sum_{l=0}^{N_{syml}^{sh''}-1} M_{sc}^{PSSCH}(l) \right\rceil \quad (11)$$

$N_{syml}^{sh''}$ represents a quantity of symbols in the first time unit excluding a PSFCH, $M_{sc}^{PSSCH}(l)$ represents a quantity of subcarriers in the data channel scheduling bandwidth, and $M_{sc}^{PSSCH}(l)$ is a quantity that is of subcarriers in a control channel bandwidth on symbol l and that is configured by higher layer RRC. α represents a scale factor of a resource used to transmit the second-stage control information, where 0<α≤1.

For example, $N_{syml}^{sh''}$ satisfies Formula (11a) or (11b):

$$N_{syml}^{sh''} = N_{syml}^{sh} - N_{symbol}^{PSFCH} \quad (11a)$$

$$N_{syml}^{sh''} = \text{lengthSLsymbols} - N_{symbol}^{PSFCH} - 2 \quad (11b)$$

lengthSLsymbols represents a quantity that is of symbols included in a sidelink communication slot and that is configured by higher layer RRC. $N_{symbol}^{PSFCH}$ represents a quantity of symbols occupied by the PSFCH, and is related to a configuration period of the PSFCH. For example, when the configuration period of the PSFCH is 0, $N_{symbol}^{PSFCH}=0$; or when the configuration period of the PSFCH is 1, 2, or 4, $N_{symbol}^{PSFCH}=3$. Alternatively, based on a specific value of the configuration period of the PSFCH, $N_{symbol}^{PSFCH} \in \{1, 2, 3\}$, that is, $N_{symbol}^{PSFCH}$ is any value in a set $\{0,1,2,3\}$.

It should be understood that Formula (11a) or Formula (11b) may be substituted into Formula (11) to obtain an equivalent variation of Formula (11), and the equivalent variation shall also fall within the protection scope of this application.

Further, $M_{sc}^{PSSCH}(l)$ is the same on all symbols, that is, $M_{sc}^{PSSCH}(i)=M_{sc}^{PSSCH}(j)$, i=0,1, . . . , $N_{syml}^{sh''}-1$, j=0,1, . . . , $N_{syml}^{sh''}-1$, and i is not equal to j. In this case, $M_{sc}^{PSSCH}(l)$ may be represented as $M_{sc}^{PSSCH}$. Correspondingly, Formula (11) is transformed into:

$$N_{SCI2}^{bound}=\lceil \alpha(N_{syml}^{sh''} *M_{sc}^{PSSCH}) \rceil$$

In a possible example, considering resources occupied by the control channel, $N_{SCI}^{bound}$ is defined as a part of a sum of quantities of REs of the data channel in the data channel scheduling bandwidth, that is, $N_{SCI2}^{bound}$ satisfies Formula (12):

$$N_{SCI2}^{bound} = \left\lceil \alpha \sum_{l=0}^{N_{syml}^{sh''}-1} \left( M_{sc}^{PSSCH}(l) - M_{sc}^{PSCCH}(l) \right) \right\rceil \quad (12)$$

For a meaning of $N_{syml}^{sh''}$, refer to the description of Formula (11). For a possible value of $N_{syml}^{sh''}$, refer to Formulas (11a) and (11b). $M_{sc}^{PSSCH}(l)$ represents a quantity of subcarriers in the data channel scheduling bandwidth. $M_{sc}^{PSCCH}(l)$ is a quantity that is of subcarriers in a control channel bandwidth on symbol l and that is configured by higher layer RRC. $\alpha$ represents a scale factor of a resource used to transmit the second-stage control information, where $0<\alpha \le 1$.

In a possible example, considering that quantities of subcarriers included in the data channel bandwidth on all symbols l are the same, $M_{sc}^{PSSCH}(l)$ may be represented as $M_{sc}^{PSSCH}$. $M_{sc}^{PSSCH}$ is a quantity of subcarriers in the data channel scheduling bandwidth. In addition, on symbol l to which the control channel is not mapped, $M_{sc}^{PSCCH}(l)=0$. On symbol l to which the control channel is mapped, a quantity of included subcarriers of the control channel is the same. To be specific, $M_{sc}^{PSSCH}(l)=M_{sc}^{PSSCH}$. $M_{sc}^{PSSCH}$ is a quantity that is of subcarriers available for the data channel in frequency domain and that is configured by higher layer RRC. That is, Formula (12) is transformed into Formula (13):

$$N_{SCI2}^{bound}=\lceil \alpha(N_{syml}^{sh''} *M_{sc}^{PSSCH}- N_{syml}^{PSCCH} *M_{sc}^{PSCCH}) \rceil \quad (13)$$

In the foregoing example, the data channel scheduling bandwidth is indicated on the control channel.

It should be understood that any one of Formulas (11), (12), and (13) or corresponding variations thereof may be substituted into Formulas (7) to (10) to obtain corresponding equivalent variations, and these equivalent variations shall fall within the protection scope of this application.

It should be further understood that, based on the calculation manners of the parameters listed in Formulas (3) to (10) or corresponding variations thereof, further variations or equivalent replacements may be made to Formula (2) or Formula (2a). For brevity, examples are not listed one by one herein. However, it may be understood that, in some cases, $N_{RE}$ may be calculated based on a transformed formula or an equivalent formula obtained through replacement, and all these variations shall fall within the protection scope of this application.

Manner 2

The manner includes: determining, based on a quantity of REs that are in each second sub-resource and that are used to transmit the second sub-information, a sum of quantities of REs that are in each second sub-resource and that are used to transmit the data and the first sub-information; and determining, based on the sum of the quantities of REs that are in each second sub-resource and that are used to transmit the data and the first sub-information, and a quantity of REs that are in the first time-frequency resource and that are used to transmit the first sub-information, the quantity of REs that are in the first time-frequency resource and that are used to transmit the data.

A difference from Manner 1 lies in that in Manner 1, the sum of the quantities of REs that are in each first sub-resource and that are used to transmit the data and the first sub-information is first determined, but in Manner 2, the sum of the quantities of REs that are in each second sub-resource and that are used to transmit the data and the first sub-information is first determined.

For example, a sum of quantities of REs that are in an $i^{th}$ second sub-resource in the first time-frequency resource and that are used to transmit the data and the first sub-information satisfies Formula (14):

$$N'_{RE,i}=N_{SC}^{PRB} *N_{syml}^{sh'}-N_{DMRS}^{i}-N_{oh} \quad (14)$$

$N'_{RE,i}$ represents the sum of the quantities of REs that are in the $i^{th}$ second sub-resource and that are used to transmit the data and the first sub-information, and i=0, 1, . . . , $N_{PSSCH}^{PRB}-1$.

$N_{SC}^{PRB}$ represents a quantity of subcarriers in a PRB, and $N_{DMRS}^{i}$ represents a quantity of REs that are in the i'i second sub-resource and that are used to transmit the data channel demodulation pilot.

$N_{oh}$ includes a sum of quantities of REs that are in the $i^{th}$ second sub-resource and that are used to transmit the PTRS and/or the CSI-RS. In other words, $N_{oh}$ is a quantity of REs that are configured for each second sub-resource and that are used to transmit the PTRS and/or the CSI-RS.

It should be understood that, if the PTRS needs to be transmitted, $N_{oh}$ includes the quantity of REs used to transmit the PTRS; or if the PTRS does not need to be transmitted, $N_{oh}$ includes a quantity of REs not used to transmit the PTRS, in other words, the quantity of REs used to transmit the PTRS is 0. If the CSI-RS needs to be transmitted, $N_{oh}$ includes the quantity of REs used to transmit the CSI-RS; or if the CSI-RS does not need to be transmitted, $N_{oh}$ includes a quantity of REs not used to transmit the CSI-RS, or in other words, the quantity of REs used to transmit the CSI-RS is 0.

Optionally, the quantity of REs that are in the first time-frequency resource and that are used to transmit the data satisfies Formula (15):

$$N_{RE}=\Sigma_{i=0}^{N_{PSSCH}^{PRB}-1} N'_{RE,i}-N_{PSCCH}^{RE}-N_{oh\_SCI2}^{RE} \quad (15)$$

$N_{RE}$ represents the quantity of REs that are in the first time-frequency resource and that are used to transmit the data, $N_{PSSCCH}^{RE}$ represents a sum of quantities of REs that are in the first time-frequency resource and that are used to transmit the control channel and the control channel demodulation pilot in the first sub-information, and $N_{oh\_SCI2}^{RE}$ represents a quantity of REs that are in the first time-frequency resource and that are used to transmit the second-stage control information in the first sub-information.

For possible calculation manners of $N_{PSCCH}^{RE}$ and $N_{oh\_SCI2}^{RE}$, refer to related content in Manner 1.

It should be understood that Formula (14) may be substituted into Formula (15) to obtain an equivalent variation of Formula (15), and the equivalent variation shall also fall within the protection scope of this application. It should be further understood that, based on the calculation manners of the parameters listed in Formulas (3) to (10) or corresponding variations thereof, further variations or equivalent replacements may be made to Formula (15) or a variation thereof. For brevity, examples are not listed one by one herein. However, it may be understood that, in some cases, $N_{RE}$ may be calculated based on a transformed formula or an equivalent formula obtained through replacement, and all these variations shall fall within the protection scope of this application.

Manner 3

The manner includes: determining, based on a quantity of REs that are in each first sub-resource and that are used to transmit third sub-information, a sum of quantities of REs that are in each first sub-resource and that are used to transmit the data and the second-stage control information; and determining, based on the sum of the quantities of REs that are in each first sub-resource and that are used to transmit the data and the second-stage control information, and a quantity of REs that are in the first time-frequency resource and that are used to transmit the second-stage control information, the quantity of REs that are in the first time-frequency resource and that are used to transmit the data. The third sub-information includes at least one of the following: the data channel demodulation pilot, the control channel, the control channel demodulation pilot, the PTRS, or the CSI-RS.

For example, the third sub-information is information other than the second-stage control information in the first information.

A difference from Manner 1 lies in that in Manner 1, the sum of the quantities of REs that are in each first sub-resource and that are used to transmit the data and the first sub-information is first determined, but in Manner 3, the sum of the quantities of REs that are in each first sub-resource and that are used to transmit the data and the second-stage control information is first determined.

Optionally, a sum of quantities of REs that are in an $i^{th}$ first sub-resource in the first time-frequency resource and that are used to transmit the data and the second-stage control information satisfies Formula (16):

$$N'_{RE,i} = N_{SC}^{PRB} * N_{sub-ch}^{PRB} * N_{syml}^{sh'} - N_{DMRS}^{i} - N_{oh} \quad (16)$$

$N'_{RE,i}$ represents the sum of the quantities of REs that are in the $i^{th}$ first sub-resource and that are used to transmit the data and the second-stage control information, and $i=0, 1, \ldots, N_{PSSCH}^{sub-ch}-1$.

$N_{SC}^{PRB}$ represents a quantity of subcarriers in a PRB, $N_{sub-ch}^{PRB}$ represents a quantity of PRBs in a sub-channel, and $N_{DMRS}^{i}$ represents a quantity of REs that are in the $i^{th}$ first sub-resource and that are used to transmit the data channel demodulation pilot.

$N_{oh}$ includes a sum of quantities of REs that are in the $i^{th}$ first sub-resource and that are used to transmit at least one of the following: the control channel, the control channel demodulation pilot, the PTRS, or the CSI-RS. It should be understood that $N_{oh}$ includes a quantity of REs for any one of the foregoing items that needs to be transmitted. If the CSI-RS needs to be transmitted, $N_{oh}$ includes a quantity of REs used to transmit the CSI-RS.

Alternatively, $N_{oh}$ is a quantity of REs that are used to transmit information other than the data channel demodulation pilot in the third sub-information.

Optionally, the quantity of REs that are in the first time-frequency resource and that are used to transmit the data satisfies Formula (17):

$$N_{RE} = \Sigma_{i=0}^{N_{PSSCH}^{sub-ch}-1} N'_{RE,i} - N_{oh\_SCI2}^{RE} \quad (17)$$

$N_{RE}$ represents the quantity of REs that are in the first time-frequency resource and that are used to transmit the data, and $N_{oh\_SCI2}^{RE}$ represents a quantity of REs that are in the first time-frequency resource and that are used to transmit the second-stage control information.

For possible calculation manners of $N_{oh\_SCI2}^{RE}$, refer to related content in Manner 1.

It should be understood that Formula (16) may be substituted into Formula (17) to obtain an equivalent variation of Formula (17), and the equivalent variation shall also fall within the protection scope of this application. It should be further understood that, based on the calculation manners of the parameters listed in Formulas (4) to (10) or corresponding variations thereof, further variations or equivalent replacements may be made to Formula (17) or a variation thereof. For brevity, examples are not listed one by one herein. However, it may be understood that, in some cases, $N_{RE}$ may be calculated based on a transformed formula or an equivalent formula obtained through replacement, and all these variations shall fall within the protection scope of this application.

Manner 4

The manner includes: determining, based on a quantity of REs that are in each second sub-resource and that are used to transmit third sub-information, a sum of quantities of REs that are in each second sub-resource and that are used to transmit the data and the second-stage control information; and determining, based on the sum of the quantities of REs that are in each second sub-resource and that are used to transmit the data and the second-stage control information, and a quantity of REs that are in the first time-frequency resource and that are used to transmit the second-stage control information, the quantity of REs that are in the first time-frequency resource and that are used to transmit the data. The third sub-information includes at least one of the following: the data channel demodulation pilot, the control channel, the control channel demodulation pilot, the PTRS, or the CSI-RS.

For example, the third sub-information is information other than the second-stage control information in the first information.

A difference from Manner 3 lies in that in Manner 3, the sum of the quantities of REs that are in each first sub-resource and that are used to transmit the data and the second-stage control information is first determined, but in Manner 4, the sum of the quantities of REs that are in each second sub-resource and that are used to transmit the data and the second-stage control information is first determined.

Optionally, a sum of quantities of REs that are in an $i^{th}$ second sub-resource in the first time-frequency resource and that are used to transmit the data and the second-stage control information satisfies Formula (18):

$$N'_{RE,i} = N_{SC}^{PRB} * N_{syml}^{sh'} - N_{DMRS}^{i} - N_{oh} \quad (18)$$

$N'_{RE,i}$ represents the sum of the quantities of REs that are in the $i^{th}$ second sub-resource and that are used to transmit the data and the second-stage control information, and i=0, 1, ..., $N_{PSSCH}^{PRB}-1$.

$N_{SC}^{PRB}$ represents a quantity of subcarriers in a PRB, and $N_{DMRS}^i$ represents a quantity of REs that are in the $i^{th}$ second sub-resource and that are used to transmit the data channel demodulation pilot.

$N_{oh}$ includes a sum of quantities of REs that are in the $i^{th}$ second sub-resource and that are used to transmit at least one of the following: the control channel, the control channel demodulation pilot, the PTRS, or the CSI-RS. It should be understood that $N_{oh}$ includes a quantity of REs for any one of the foregoing items that need to be transmitted. If the CSI-RS needs to be transmitted, $N_{oh}$ includes a quantity of REs used to transmit the CSI-RS.

Alternatively, $N_{oh}$ is a quantity of REs that are used to transmit information other than the data channel demodulation pilot in the third sub-information.

Optionally, the quantity of REs that are in the first time-frequency resource and that are used to transmit the data satisfies Formula (19):

$$N_{RE}=\Sigma_{i=0}^{N_{PSSCH}^{PRB}-1}N'_{RE,i}-N_{oh\_SCI2}^{RE} \quad (19)$$

$N_{RE}$ represents the quantity of REs that are in the first time-frequency resource and that are used to transmit the data, and $N_{oh\_SCI2}^{RE}$ represents a quantity of REs that are in the first time-frequency resource and that are used to transmit the second-stage control information.

For possible calculation manners of $N_{oh\_SCI2}^{RE}$, refer to related content in Manner 1.

It should be understood that Formula (18) may be substituted into Formula (19) to obtain an equivalent variation of Formula (19), and the equivalent variation shall also fall within the protection scope of this application. It should be further understood that, based on the calculation manners of the parameters listed in Formulas (4) to (10) or corresponding variations thereof, further variations or equivalent replacements may be made to Formula (15) or a variation thereof. For brevity, examples are not listed one by one herein. However, it may be understood that, in some cases, $N_{RE}$ may be calculated based on a transformed formula or an equivalent formula obtained through replacement, and all these variations shall fall within the protection scope of this application.

Manner 5

The manner includes: determining, based on a quantity of REs that are in each first sub-resource and that are used to transmit the first information, a quantity of REs that are in each first sub-resource and that are used to transmit the data.

It may be understood that a sum of quantities of REs that are in the $N_{PSSCH}^{sub-ch}$ first sub-resources and that are used to transmit the data is equal to the quantity of REs that are in the first time-frequency resource and that are used to transmit the data.

Example 1

A quantity of REs that are in an $i^{th}$ first sub-resource in the first time-frequency resource and that are used to transmit the data satisfies Formula (20):

$$N_{RE}^i=N_{SC}^{PRB}*N_{sub-ch}^{PRB}*N_{syml}^{sh'}-N_{DMRS}^i-N_{PSCCH}^i-N_{oh} \quad (20)$$

$N_{RE}^i$ represents the quantity of REs that are in the $i^{th}$ first sub-resource and that are used to transmit the data, and i=0, 1, ..., $N_{PSSCH}^{sub-ch}-1$.

$N_{SC}^{PRB}$ represents a quantity of subcarriers in a PRB, $N_{sub-ch}^{PRB}$ represents a quantity of PRBs in a sub-channel, $N_{DMRS}^i$ represents a quantity of REs that are in the $i^{th}$ first sub-resource and that are used to transmit the data channel demodulation pilot, and $N_{PSCCH}^i$ represents a sum of quantities of REs that are in the $i^{th}$ first sub-resource and that are used to transmit the control channel and the control channel demodulation pilot.

$N_{oh}$ represents a quantity of REs that are in the $i^{th}$ first sub-resource and that are used to transmit fourth sub-information, and the fourth sub-information includes the second-stage control information, the PTRS, and/or the CSI-RS in the first information.

It should be understood that, if the PTRS does not need to be transmitted, $N_{oh}$ represents a quantity of REs that are in the $i^{th}$ first sub-resource and that are used to transmit the CSI-RS. For example, $N_{oh}=\{1,2\}$. If the CSI-RS does not need to be transmitted, $N_{oh}$ represents a quantity of REs that are in the $i^{th}$ first sub-resource and that are used to transmit the PTRS. For example, $N_{oh}=\{1,2\}$.

Optionally, when i=0, $N_{PSCCH}^i=N_{SC}^{PRB}*N_{syml}^{PSCCH}*N_{PSCCH}^{PRB}$; or when i>0, $N_{PSCCH}^i=0$.

$N_{syml}^{PSCCH}$ represents a quantity of symbols that are in the first time unit and that are used to transmit the control channel, and $N_{PSCCH}^{PRB}$ represents a quantity of PRBs that are in the data channel resource and that are used to transmit the control channel.

With reference to FIG. 3, a sum of quantities of REs that are in sub-channel 0 and that are used to transmit the control channel and the control channel demodulation pilot is $N_{PSCCH}^0=N_{SC}^{RB}*N_{syml}^{PSCCH}*N_{PSCCH}^{PRB}$, and a sum of quantities of REs that are in sub-channel 1 and that are used to transmit the control channel and the control channel demodulation pilot is $N_{PSCCH}^1=0$.

Example 2

A quantity of REs that are in an $i^{th}$ first sub-resource in the first time-frequency resource and that are used to transmit the data satisfies Formula (21):

$$N_{RE}^i=N_{SC}^{PRB}*N_{sub-ch}^{PRB}*N_{syml}^{sh'}-N_{DMRS}^i-N_{oh} \quad (21)$$

$N_{RE}^i$ represents the quantity of REs that are in the $i^{th}$ first sub-resource and that are used to transmit the data, and i=0, 1, ..., $N_{PSSCH}^{sub-ch}-1$.

$N_{SC}^{PRB}$ represents a quantity of subcarriers in a PRB, $N_{sub-ch}^{PRB}$ represents a quantity of PRBs in a sub-channel, $N_{DMRS}^i$ represents a quantity of REs that are in the $i^{th}$ first sub-resource and that are used to transmit the data channel demodulation pilot, and $N_{PSCCH}^i$ represents a sum of quantities of REs that are in the $i^{th}$ first sub-resource and that are used to transmit the control channel and the control channel demodulation pilot.

$N_{oh}$ represents a quantity of REs that are in the $i^{th}$ first sub-resource and that are used to transmit fifth sub-information, and the fifth sub-information includes the second-stage control information, the control channel, the control channel demodulation pilot, the PTRS, and the CSI-RS in the first information.

Optionally, quantities of REs that are used to transmit the fifth sub-information and that are in all first sub-resources are the same.

Manner 6

The manner includes: determining, based on a quantity of REs that are in each second sub-resource and that are used to transmit the first information, a quantity of REs that are in each second sub-resource and that are used to transmit the data.

It may be understood that a sum of quantities of REs that are in the $N_{PSSCH}^{PRB}$ second sub-resources and that are used to transmit the data is equal to the quantity of REs that are in the first time-frequency resource and that are used to transmit the data. $N_{PSSCH}^{PRB}$ is a quantity of second sub-resources included in the first time-frequency resource.

Example 1

A quantity of REs that are in an $i^{th}$ second sub-resource in the first time-frequency resource and that are used to transmit the data satisfies Formula (22):

$$N_{RE}^i = N_{SC}^{PRB} * N_{syml}^{sh'} - N_{DMRS}^i - N_{PSCCH}^i - N_{oh} \quad (22)$$

$N_{RE}^i$ represents the quantity of REs that are in the $i^{th}$ second sub-resource and that are used to transmit the data, and $i=0, 1, \ldots, N_{PSSCH}^{PRB}-1$. $N_{SC}^{PRB}$ represents a quantity of subcarriers in a PRB, $N_{DMRS}^i$ represents a quantity of REs that are in the $i^{th}$ second sub-resource and that are used to transmit the data channel demodulation pilot, and $N_{PSCCH}^i$ represents a sum of quantities of REs that are in the $i^{th}$ second sub-resource and that are used to transmit the control channel and the control channel demodulation pilot. $N_{oh}$ represents a quantity of REs that are in the $i^{th}$ second sub-resource and that are used to transmit fourth sub-information, and the fourth sub-information includes the second-stage control information, and the PTRS and the CSI-RS in the first information.

Optionally, when $0 \leq i < N_{PSCCH}^{PRB}$, $N_{PSCCH}^i = N_{SC}^{PRB} * N_{syml}^{PSCCH}$; or
when $i \geq N_{PSCCH}^{PRB}$, $N_{PSCCH}^i = 0$.

$N_{PSCCH}^{PRB}$ represents a quantity of PRBs that are in the data channel resource and that are used to transmit the control channel, and $N_{syml}^{PSCCH}$ represents a quantity of symbols that are in the first time unit and that are used to transmit the control channel.

Example 2

A quantity of REs that are in an $i^{th}$ second sub-resource in the first time-frequency resource and that are used to transmit the data satisfies Formula (23):

$$N_{RE}^i = N_{SC}^{PRB} * N_{syml}^{sh'} - N_{DMRS}^i - N_{oh} \quad (23)$$

$N_{RE}^i$ represents the quantity of REs that are in the $i^{th}$ second sub-resource and that are used to transmit the data, and $i=0, 1, \ldots, N_{PSSCH}^{PRB}-1$.

$N_{SC}^{PRB}$ represents a quantity of subcarriers in a PRB, $N_{DMRS}^i$ represents a quantity of REs that are in the $i^{th}$ second sub-resource and that are used to transmit the data channel demodulation pilot, and $N_{PSCCH}^i$ represents a sum of quantities of REs that are in the $i^{th}$ second sub-resource and that are used to transmit the control channel and the control channel demodulation pilot.

$N_{oh}$ represents a quantity of REs that are in the $i^{th}$ first sub-resource and that are used to transmit fifth sub-information, and the fifth sub-information includes the second-stage control information, the control channel, the control channel demodulation pilot, the PTRS, and the CSI-RS in the first information.

It may be understood that, for Manner 5 and Manner 6, $N_{RE} = \sum_{i=0}^{N_{PSSCH}^{PRB}-1} N_{RE}^i$.

After the quantity of REs that are in the first time-frequency resource and that are used to transmit the data, namely, $N_{RE}$ is determined in step S210, $N_{info} = N_{RE} * R * Q_m * v$ may be first determined in step S220, where R represents the bit rate of the data channel, $Q_m$ represents the modulation order of the data channel, v represents a quantity of transport layers of the TB, and then the TBS may be determined based on a current technology. For details, refer to the current technology. Details are not described herein.

The method provided in embodiments of this application is described in detail above with reference to FIG. 2 to FIG. 4. Apparatuses provided in embodiments of this application are described below in detail with reference to FIG. 5 and FIG. 6.

Figure 5:
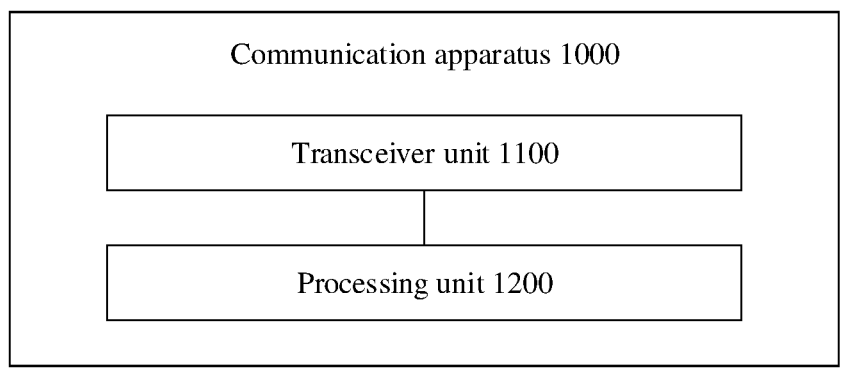
FIG. 5 is a schematic structural diagram of a communication apparatus according to this application.

FIG. 5 is a schematic block diagram of a communication apparatus according to an embodiment of this application. As shown in FIG. 5, the communication apparatus 1000 may include a processing unit 1200. Optionally, the communication apparatus may further include a transceiver unit 1100.

The transceiver unit 1100 may be configured to send information to another apparatus or receive information from the another apparatus, for example, send or receive a transport block. The processing unit 1200 may be configured to perform internal processing of the apparatus, to determine a quantity of REs that are in a first time-frequency resource and that are used to transmit data.

In an implementation, the communication apparatus 1000 may correspond to an execution body of the foregoing method, for example, may be the transmit-side terminal device, or may be the receive-side terminal device. The communication apparatus 1000 may be a terminal device or a chip configured in the terminal device, and may include units configured to perform operations performed by the terminal device. In addition, the units in the communication apparatus 1000 are separately configured to implement operations performed by the terminal device in a corresponding method.

In an embodiment, the processing unit 1200 is configured to determine, based on a quantity of REs that are in a first time-frequency resource and that are used to transmit first information, a quantity of REs that are in the first time-frequency resource and that are used to transmit data. The first time-frequency resource includes a first time unit in time domain and includes a data channel resource in frequency domain. The first information includes at least one of the following: a control channel, a control channel demodulation pilot, a data channel demodulation pilot, second-stage control information, a phase tracking reference signal PTRS, and a channel state information reference signal CSI-RS.

Optionally, the processing unit may be further configured to determine a transport block size based on the quantity of REs used to transmit the data.

Optionally, the transceiver unit 1100 may be configured to receive or send a transport block.

For how the processing unit 1200 specifically determines, based on the quantity of resource elements REs that are in the first time-frequency resource and that are used to transmit the first information, the quantity of REs that are in the first time-frequency resource and that are used to transmit the data, refer to the descriptions in the foregoing method embodiment.

In another implementation, the communication apparatus 1000 may correspond to the network device in the foregoing method embodiment. The communication apparatus 1000 may be a network device or a chip configured in the network device, and may include units configured to perform operations performed by the network device. In addition, the units in the communication apparatus 1000 are separately configured to implement operations performed by the network device in a corresponding method.

In an embodiment, the transceiver unit 1200 is configured to send indication information, where the indication information is used to indicate a value of one or more of the following parameters: $N_{oh}$, $N_{oh\_SCI2}^{RE}$, and $1_\alpha$.

$N_{oh}$ represents one of the following items in each first sub-resource or each second sub-resource:

a quantity of REs used to transmit a PTRS and/or a CSI-RS; a sum of quantities of REs used to transmit at least one of the following: a control channel, a control channel demodulation pilot, the PTRS, or the CSI-RS; a sum of quantities of REs used to transmit at least one of the following: second-stage control information, the PTRS, and the CSI-RS; or a sum of quantities of REs used to transmit at least one of the following: the second-stage control information, the control channel, the control channel demodulation pilot, the PTRS, and the CSI-RS.

$N_{oh\_SCI2}^{RE}$ represents a quantity of REs that are in a first time-frequency resource and that are used to transmit the second-stage control information.

$1_\alpha$ represents a transport block adjustment factor. For example, $1_\alpha$ specifically represents a quantity of symbols in a first time unit that are adjusted for calculating a transport block size of a data channel.

The first time-frequency resource includes the first time unit in time domain and includes a data channel resource in frequency domain. The first sub-resource includes the first time unit in time domain and includes one sub-channel in the data channel resource in frequency domain. The second sub-resource includes the first time unit in time domain and includes one PRB in the data channel resource in frequency domain.

Optionally, the processing unit 1100 may first determine the indication information.

It should be understood that a specific process in which each unit performs the foregoing corresponding steps of the corresponding network element is described in detail in the foregoing method embodiment. For brevity, details are not described herein again.

Figure 6:
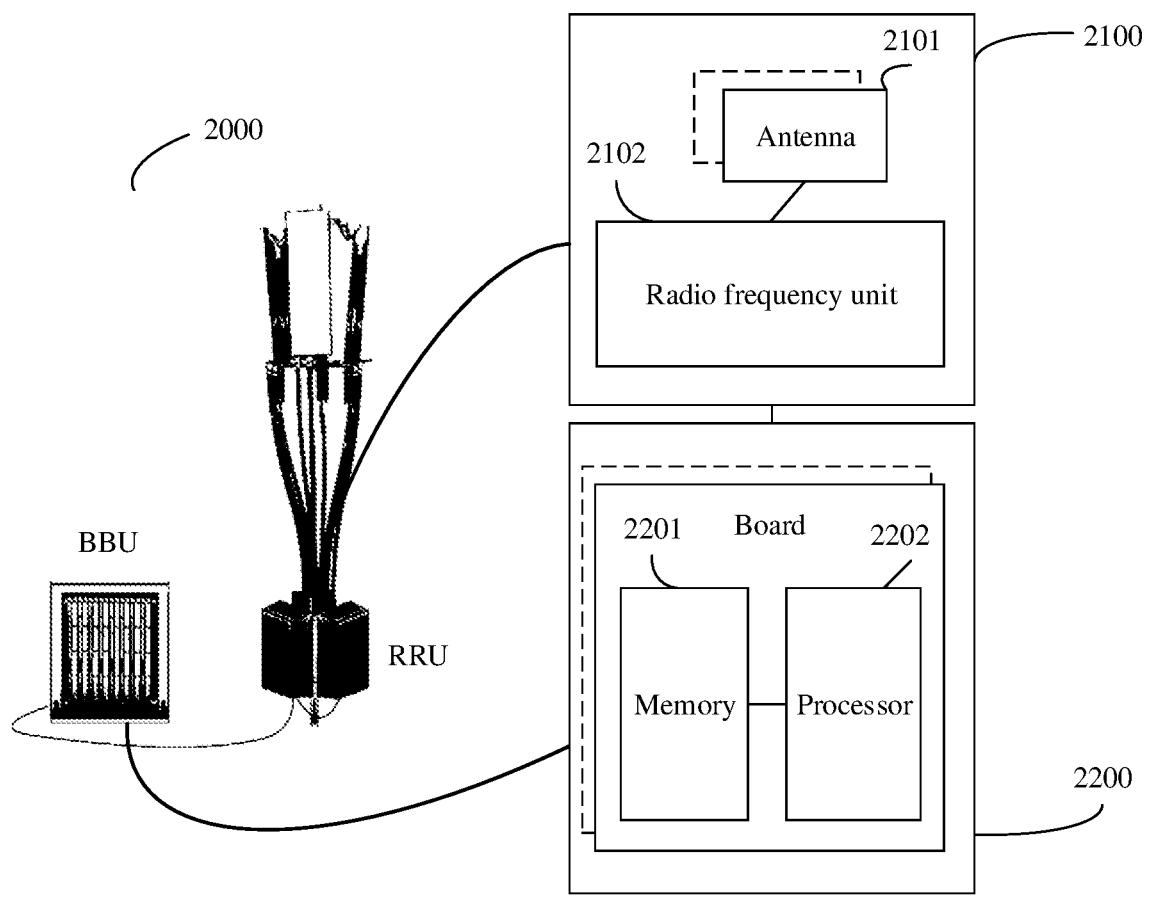
FIG. 6 is a schematic structural diagram of a network device according to this application.

It should be further understood that when the communication apparatus 1000 is a network device, the transceiver unit 1100 in the communication apparatus 1000 may correspond to an RRU 3100 in a network device 2000 shown in FIG. 6, and the processing unit 1200 in the communication apparatus 1000 may correspond to a BBU 3200 in the network device 2000 shown in FIG. 6. When the communication apparatus 1000 is a chip configured in the network device, the transceiver unit 1100 in the communication apparatus 1000 may be an input/output interface.

Figure 7:
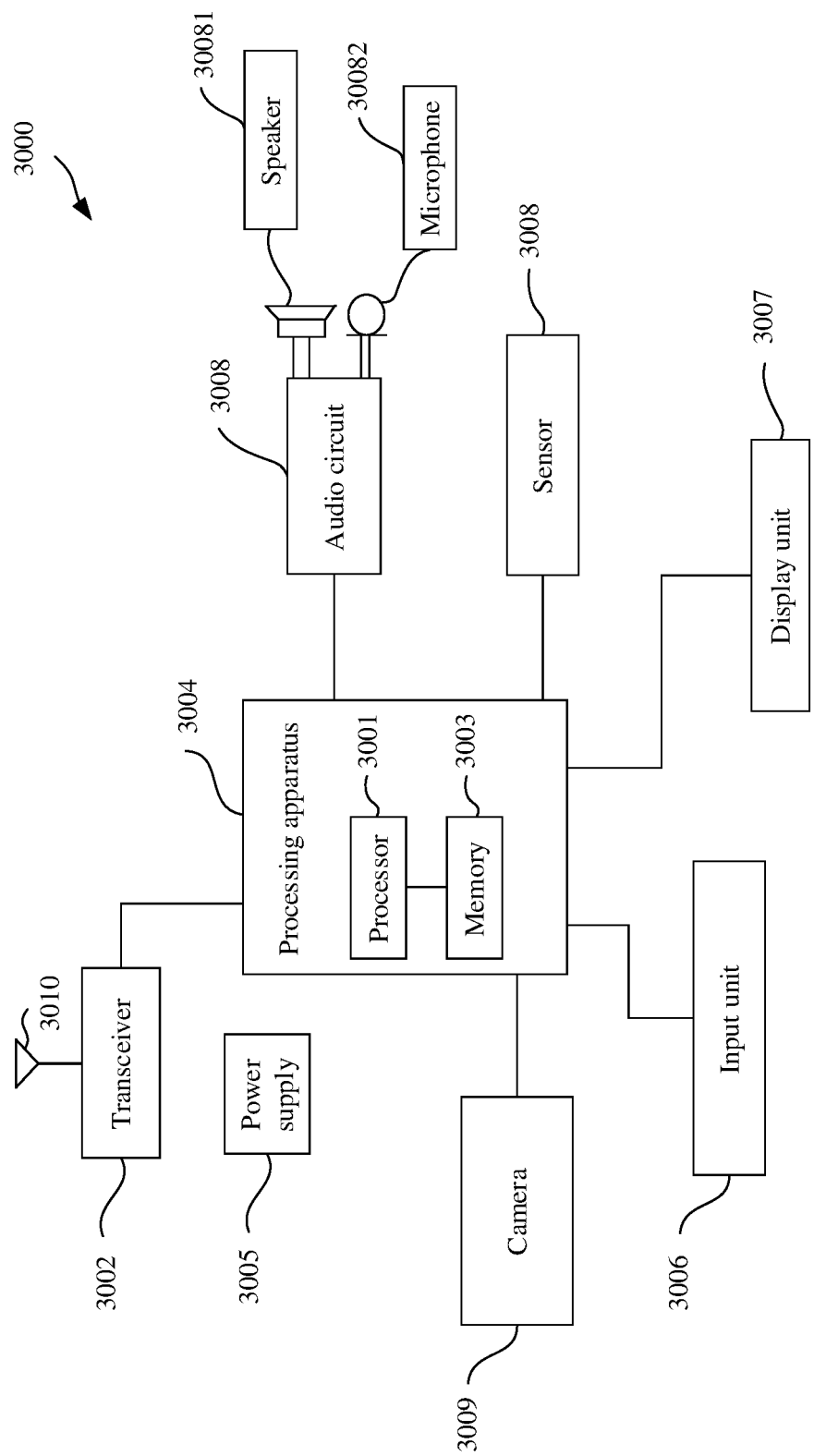
FIG. 7 is a schematic structural diagram of a terminal device according to this application.

It should be further understood that, when the communication apparatus 1000 is a terminal device, the transceiver unit 1100 in the communication apparatus 1000 may correspond to a transceiver 3002 in a terminal device 3000 shown in FIG. 7, and the processing unit 1200 in the communication apparatus 1000 may correspond to a processor 3001 in the terminal device 3000 shown in FIG. 7.

FIG. 6 is a schematic structural diagram of a network device according to an embodiment of this application, for example, may be a schematic structural diagram of a base station. The base station 2000 may be used in the system shown in FIG. 1, to perform functions of the network device in the foregoing method embodiment. As shown in the figure, the base station 2000 may include one or more radio frequency units, for example, one or more remote radio units (remote radio units, RRUs) 2100, and one or more baseband units (BBUs) (which may also be referred to as distributed units (DUs)) 2200. The RRU 2100 may be referred to as a transceiver unit or a communication unit, and corresponds to the transceiver unit 1100 in FIG. 5. Optionally, the transceiver unit 2100 may also be referred to as a transceiver machine, a transceiver circuit, a transceiver, or the like, and may include at least one antenna 2101 and a radio frequency unit 2102. Optionally, the transceiver unit 2100 may include a receiving unit and a sending unit. The receiving unit may correspond to a receiver (or referred to as a receiver machine or a receiver circuit), and the sending unit may correspond to a transmitter (or referred to as a transmitter machine or a transmitter circuit). The RRU 2100 is mainly configured to send and receive a radio frequency signal and perform conversion between the radio frequency signal and a baseband signal. The BBU 2200 is mainly configured to: perform baseband processing, control the base station, and so on. The RRU 2100 and the BBU 2200 may be physically disposed together; or may be physically separately disposed, that is, in a distributed base station.

The BBU 2200 is a control center of the base station, or may be referred to as a processing unit. The BBU 2200 may correspond to the processing unit 1200 in FIG. 5, and is mainly configured to implement a baseband processing function, for example, channel coding, multiplexing, modulation, or spreading. For example, the BBU (processing unit) may be configured to control the base station to perform an operation procedure of the network device in the foregoing method embodiment.

In an example, the BBU 2200 may include one or more boards. A plurality of boards may jointly support a radio access network (for example, an LTE network) having a single access standard, or may separately support radio access networks (for example, the LTE network, a 5G network, or another network) having different access standards. The BBU 2200 further includes a memory 2201 and a processor 2202. The memory 2201 is configured to store necessary instructions and data. The processor 2202 is configured to control the base station to perform a necessary action, for example, configured to control the base station to perform the operation procedure related to the network device in the foregoing method embodiment. The memory 2201 and the processor 2202 may serve the one or more boards. In other words, a memory and a processor may be deployed on each board. Alternatively, a plurality of boards may share a same memory and a same processor. In addition, a necessary circuit may be further disposed on each board.

It should be understood that the base station 2000 shown in FIG. 6 can implement processes related to the network device in the foregoing method embodiment. Operations or functions of modules in the base station 2000 are respectively intended to implement corresponding procedures in the foregoing method embodiment. For details, refer to the descriptions in the foregoing method embodiment. To avoid repetition, detailed descriptions are appropriately omitted herein.

The BBU 2200 may be configured to perform an action implemented inside the network device in the foregoing method embodiment, and the RRU 2100 may be configured to perform an action of sending from the network device to the terminal device and an action of receiving from the terminal device in the foregoing method embodiment. For details, refer to the descriptions in the foregoing method embodiment. Details are not described herein again.

FIG. 7 is a schematic structural diagram of a terminal device 3000 according to an embodiment of this application. As shown in the figure, the terminal device 3000 includes a processor 3001 and a transceiver 3002. Optionally, the terminal device 3000 may further include a memory 3003. The processor 3001, the transceiver 3002, and the memory 3003 communicate with each other through an internal connection path, to transfer a control signal and/or a data signal. The memory 3003 is configured to store a computer program. The processor 3001 is configured to invoke the computer program from the memory 3003 and run the computer program, to control the transceiver 3002 to receive or send a signal.

The processor 3001 and the memory 3003 may be combined into a processing apparatus 3004, and the processor 3001 is configured to execute program code stored in the memory 3003 to implement the foregoing functions. It should be understood that the processing apparatus 3004 shown in the figure is merely an example. During specific implementation, the memory 3003 may be integrated into the processor 3001, or may be independent of the processor 3001. This is not limited in this application.

The terminal device 3000 may further include an antenna 3010, configured to send, by using a radio signal, uplink data or uplink control signaling output by the transceiver 3002.

It should be understood that, the terminal device 3000 shown in FIG. 7 can implement the processes of the terminal device in the method embodiment. Operations or functions of modules in the terminal device 3000 are respectively intended to implement corresponding procedures in the foregoing method embodiment. For details, refer to the descriptions in the foregoing method embodiment. To avoid repetition, detailed descriptions are appropriately omitted herein.

Optionally, the terminal device 3000 may further include a power supply 3005, configured to supply power to various components or circuits in the terminal device.

In addition, to improve the functions of the terminal device, the terminal device 3000 may further include one or more of an input unit 3006, a display unit 3007, an audio circuit 3008, a camera 3009, a sensor 3008, and the like, and the audio circuit may further include a speaker 30081, a microphone 30082, and the like.

It should be understood that the processing apparatus may be a chip. For example, the processing apparatus may be a field programmable gate array (field programmable gate array, FPGA), may be a general-purpose processor, a digital signal processor (digital signal processor, DSP), an application specific integrated circuit (application specific integrated circuit, ASIC), the field programmable gate array (field programmable gate array, FPGA), another programmable logic device, a discrete gate, a transistor logic device, or a discrete hardware component, may be a system on chip (system on chip, SoC), may be a central processing unit (central processing unit, CPU), may be a network processor (network processor, NP), may be a digital signal processing circuit (digital signal processor, DSP), may be a micro controller unit (micro controller unit, MCU), or may be a programmable controller (programmable logic device, PLD) or another integrated chip. The processor may implement or perform the methods, the steps, and logical block diagrams that are disclosed in embodiments of this application. The general-purpose processor may be a microprocessor, or the processor may be any conventional processor or the like. The steps in the methods disclosed with reference to embodiments of this application may be directly performed and completed by a hardware decoding processor, or may be performed and completed by using a combination of hardware in a decoding processor and a software module. A software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps of the foregoing method in combination with hardware of the processor.

The memory 3003 may be a volatile memory or a nonvolatile memory, or may include both a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM) that is used as an external buffer. By way of example but not limitation, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

It should be noted that the memory in the system and method described in this specification includes but is not limited to these memories and any memory of another appropriate type.

This application further provides a computer program product. The computer program product includes computer program code. When the computer program code runs on a computer, the computer is enabled to perform the method performed by the terminal device or the network device in any one of the foregoing method embodiments.

This application further provides a computer-readable medium. The computer-readable medium stores program code. When the program code is run on a computer, the computer is enabled to perform the method performed by the network device or the terminal device in the foregoing method embodiment.

This application further provides a system, including a terminal device and a network device.

An embodiment of this application further provides a processing apparatus, including a processor and an interface. The processor is configured to perform the method performed by the terminal device or the network device in any one of the foregoing method embodiments.

All or a part of the foregoing embodiments may be implemented by using software, hardware, firmware, or any combination thereof. When software is used to implement embodiments, all or some of embodiments may be implemented in a form of a computer program product. The computer program product includes one or more computer instructions. When the computer instructions are loaded and executed on a computer, the procedures or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (digital video disc, DVD)), a semiconductor medium (for example, a solid-state drive (solid-state drive, SSD)), or the like.

Terms such as "component", "module", and "system" used in this specification are used to indicate a computer-related entity, hardware, firmware, a combination of hardware and software, software, or software being executed. For example, a component may be but is not limited to a process that runs on a processor, a processor, an object, an executable file, a thread of execution, a program, or a computer. As illustrated by using figures, both a computing device and an application that is run on the computing device may be components. One or more components may reside within a process or a thread of execution, and a component may be located on one computer or distributed between two or more computers. In addition, these components may be executed by various computer-readable media that store various data structures. For example, the components may communicate by using a local or remote process based on a signal having one or more data packets (for example, data from two components interacting with another component in a local system, a distributed system, or across a network such as the internet interacting with another system by using the signal).

It should be understood that, an "embodiment" mentioned throughout this specification means that particular features, structures, or characteristics related to this embodiment are included in at least one embodiment of this application. Therefore, embodiments in the entire specification do not necessarily refer to a same embodiment. In addition, these particular features, structures, or characteristics may be combined in one or more embodiments in any proper manner.

It should be understood that, in embodiments of this application, numbers "first", "second", and the like are merely used to distinguish between different objects, for example, to distinguish between different network devices, and do not constitute a limitation on the scope of embodiments of this application. Embodiments of this application are not limited thereto.

It should be further understood that, in this application, "when" and "if" mean that a network element performs corresponding processing in an objective situation, and are not intended to limit time, and the network element is not necessarily required to have a determining action during implementation, and do not mean any other limitation.

It should be further understood that, in this application, "at least one" means one or more, and "a plurality of" means two or more.

It should be further understood that in embodiments of this application, "B corresponding to A" indicates that B is associated with A, and B may be determined based on A. However, it should be further understood that determining B based on A does not mean that B is determined based on only A. B may alternatively be determined based on A and/or other information.

It should be further understood that the term "and/or" in this specification describes only an association relationship between associated objects and represents that three relationships may exist. For example, A and/or B may represent the following three cases: Only A exists, both A and B exist, and only B exists. In addition, the character "/" in this specification usually indicates an "or" relationship between the associated objects.

Unless otherwise specified, an expression used in this application similar to an expression that "an item includes one or more of the following: A, B, and C" usually means that the item may be any one of the following cases: A; B; C; A and B; A and C; B and C; A, B, and C; A and A; A, A, and A; A, A, and B; A, A, and C; A, B, and B; A, C, and C; B and B; B, B and B; B, B and C; C and C; C, C, and C; and another combination of A, B and C. In the foregoing descriptions, three elements A, B, and C are used as an example to describe an optional case of the item. When an expression is "the item includes at least one of the following: A, B, . . . , and X", in other words, more elements are included in the expression, a case to which the item is applicable may also be obtained according to the foregoing rule.

It may be understood that in embodiments of this application, the terminal device and/or the network device may perform some or all of the steps in embodiments of this application. These steps or operations are merely examples. In embodiments of this application, other operations or variations of various operations may be further performed. In addition, the steps may be performed in a sequence different from a sequence presented in embodiments of this application, and not all the operations in embodiments of this application are necessarily to be performed.

Persona of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by persons skilled in the art that, for the purpose of convenient and brief description, for a detailed working process of the foregoing systems, apparatuses, and units, refer to a corresponding process in the foregoing method embodiment. Details are not described herein again.

In the several embodiments provided in this application, it should be understood that the disclosed system, apparatus, and method may be implemented in other manners. For example, the described apparatus embodiments are merely examples. For example, division into the units is merely logical function division. During actual implementation, another division manner may be used. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or the units may be implemented in electronic, mechanical, or other forms.

The units described as separate components may or may not be physically separate, and components displayed as units may or may not be physical units. To be specific, the components may be located at one position, or may be distributed on a plurality of network units. Some or all of the units may be selected depending on actual requirements to achieve the objectives of the solutions in embodiments.

In addition, functional units in embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on this understanding, the technical solutions of this application essentially, or the part contributing to the prior art, or some of the technical solutions may be implemented in a form of a software product. The computer software product is stored in a storage medium, and includes several instructions for instructing a computer device (which may be, for example, a personal computer, a server, or a network device) to perform all or some of the steps of the methods described in embodiments of this application. The foregoing storage medium includes: any medium that can store program code, such as a USB flash drive, a removable hard disk, a read-only memory ROM, a random access memory RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
   determining, based on a quantity of resource elements (REs) that are in a first time-frequency resource and that are used to transmit first information, a quantity of REs that are in the first time-frequency resource and that are used to transmit data, wherein the first time-frequency resource comprises a first time unit in time domain and comprises a data channel resource in frequency domain, and wherein the first information comprises at least one of a control channel, a control channel demodulation pilot, a data channel demodulation pilot, second-stage control information, a phase tracking reference signal (PTRS), or a channel state information reference signal (CSI-RS);
   wherein the first information comprises the second-state control information, and wherein a quantity of $N_{oh_{SCI2}}^{RE}$ of REs that are in the first time-frequency resource and that are used to transmit the second-stage control information satisfies:

$$N_{oh\_SCI2}^{RE} = \min\left\{\left\lceil \frac{(O_{SCI2} + L_{SCI2}) * \overline{\beta}}{R * Q} \right\rceil, \left\lceil \alpha \sum_{l=0}^{N_{syml}^{sh''}-1}\left(M_{sc}^{PSSCH}(l) - M_{sc}^{PSCCH}(l)\right)\right\rceil\right\} + \gamma,$$

wherein $O_{SCI2}$ represents a valid payload size of the second-stage control information, wherein $L_{SCI2}$ represents a cyclic redundancy check (CRC) bit length of the second-stage control information, wherein R represents a bit rate of a data channel, Q represents a modulation order of the control channel, wherein $\overline{\beta}$ represents a scale factor that is of a resource for the second-stage control information and that is indicated by first control information, wherein $\alpha$ represents the scale factor of the resource used to transmit the second-stage control information, wherein $\gamma$ is an integer and represents a quantity of REs that is defined to satisfy that the second-stage control information occupies an integer quantity of physical resource block (PRBs), wherein $N_{syml}^{sh''}$=lengthSLsymbols−$N_{symbol}^{PSFCH}$−2, wherein lengthSLsymbols is a quantity of symbols of a sidelink communication slot, $N_{symbol}^{PSFCH}$ is a quantity of symbols occupied by a PSFCH, wherein $N_{symbold}^{PSFCH}$=0 or, $N_{symbol}^{PSFCH}$=3, $M_{sc}^{PSSCH}(l)$ is a quantity of sub-carriers in a data channel scheduling bandwidth, and wherein $M_{sc}^{PSCCH}(l)$ is a quantity that is of subcarriers in a control channel bandwidth on symbol l and that is configured by higher layer RRC, and wherein Q and $\overline{\beta}$ are integers.

2. The method according to claim 1, further comprising: determining, based on the quantity of REs that are in the first time-frequency resource and that are used to transmit the data, a transport block size (TBS) for transmitting the data, wherein in a process of determining the TBS, a value of $\gamma$ is preconfigured.

3. The method according to claim 1, wherein the value of $\gamma$ is 0.

4. The method according to claim 1, wherein the value of lengthSLsymbols is set by higher layer radio resource control (RRC).

5. The method according to claim 1, wherein the first time-frequency resource comprises $N_{PSSCH}^{sub-ch}$ first sub-resources, wherein the first sub-resource comprises the first time unit in time domain and comprises one sub-channel in the data channel resource in frequency domain, and wherein $N_{PSSCH}^{sub-ch}$ is a positive integer;
   wherein the first information consists of first sub-information and second sub-information, wherein the first sub-information is the control channel, the control channel demodulation pilot, and the second-stage control information, and wherein the second sub-information comprises at least one of the data channel demodulation pilot, the PTRS, or the CSI-RS; and
   wherein the determining the quantity of REs that are in the first time-frequency resource and that are used to transmit data comprises:
   determining, based on a quantity of REs that are in each first sub-resource and that are used to transmit the second sub-information, a sum of quantities of REs that are in each first sub-resource and that are used to transmit the data and the first sub-information; and
   determining, based on the sum of the quantities of REs that are in each first sub-resource and that are used to transmit the data and the first sub-information, and further based on a quantity of REs that are in the first time-frequency resource and that are used to transmit the first sub-information, the quantity of REs that are in the first time-frequency resource and that are used to transmit the data.

6. The method according to claim 5, wherein a sum of quantities of REs that are in an $i^{th}$ first sub-resource in the first time-frequency resource and that are used to transmit the data and the first sub-information satisfies:

$$N'_{RE,i} = N_{SC}^{PRB} * N_{sub-ch}^{PRB} * N_{syml}^{sh'} - N_{DMRS}^{i} - N_{oh},$$

wherein $N'_{RE,i}$ represents the sum of the quantities of REs that are in the $i^{th}$ first sub-resource and that are used to transmit the data and the first sub-information, and wherein i=0, 1, . . . , $N_{PSSCH}^{sub-ch}-1$; and wherein $N_{SC}^{PRB}$ represents a quantity of subcarriers in a physical resource block PRB, $N_{sub-ch}^{PRB}$ represents a quantity of PRBs in the sub-channel, wherein $N_{syml}^{sh'}$ represents a quantity of symbols in the first time unit that are available for encoding, wherein $N_{syml}^{sh'}=N_{syml}^{sh}-1_\alpha$, $N_{syml}^{sh}$ represents a quantity of symbols in the first time unit, wherein $1_\alpha$ represents a transport block adjustment factor, wherein $N_{DMRS}^{i}$ represents a quantity of REs that are in the $i^{th}$ first sub-resource and that are used to transmit the data channel demodulation pilot, and wherein $N_{oh}$ comprises a quantity of REs that are in the $i^{th}$ first sub-resource and that are used to transmit at least one of the PTRS or the CSI-RS, and wherein i is an integer.

7. The method according to claim 6, wherein the quantity of REs that are in the first time-frequency resource and that are used to transmit the data satisfies:

$$N_{RE}=\Sigma_{i=0}^{N_{PSSCH}^{sub-ch}-1} N'_{RE,i}-N_{PSCCH}^{RE}-N_{oh_{SCI2}}^{RE},$$

wherein $N_{RE}$ represents the quantity of REs that are in the first time-frequency resource and that are used to transmit the data, wherein $N_{PSCCH}^{RE}$ represents a sum of quantities of REs that are in the first time-frequency resource and that are used to transmit the control channel and the control channel demodulation pilot in the first sub-information, and wherein $N_{oh_{SCI2}}^{RE}$ represents a quantity of REs that are in the first time-frequency resource and that are used to transmit the second-stage control information in the first sub-information.

8. A communication apparatus, comprising:
a processor configured to:
determine, based on a quantity of resource elements (REs) that are in a first time-frequency resource and that are used to transmit first information, a quantity of REs that are in the first time-frequency resource and that are used to transmit data, wherein the first time-frequency resource comprises a first time unit in time domain and comprises a data channel resource in frequency domain, and wherein the first information comprises at least one of a control channel, a control channel demodulation pilot, a data channel demodulation pilot, second-stage control information, a phase tracking reference signal (PTRS), or a channel state information reference signal (CSI-RS);
wherein the first information comprises the second-stage control information, and wherein a quantity $N_{oh_{SCI2}}^{RE}$ of REs that are in the first time-frequency resource and that are used to transmit the second-stage control information satisfies:

$$N_{oh\_SCI2}^{RE} = \min\left\{\left\lceil\frac{(O_{SCI2}+L_{SCI2})*\bar{\beta}}{R*Q}\right\rceil, \left\lceil\alpha\sum_{l=0}^{N_{syml}^{sh''}-1}\left(M_{sc}^{PSSCH}(l)-M_{sc}^{PSCCH}(l)\right)\right\rceil\right\}+\gamma,$$

wherein $O_{SCI2}$ represents a valid payload size of the second-stage control information, wherein $L_{SCI2}$ represents a cyclic redundancy check (CRC) bit length of the second-stage control information, wherein R represents a bit rate of a data channel, Q represents a modulation order of the control channel, wherein $\bar{\beta}$ represents a scale factor that is of a resource for the second-stage control information and that is indicated by first control information, wherein $\alpha$ represents the scale factor of the resource used to transmit the second-stage control information, wherein $\gamma$ is an integer and represents a quantity of REs that is defined to satisfy that the second-stage control information occupies an integer quantity of physical resource block (PRBs), wherein $N_{syml}^{sh''}=\text{lengthSLsymbols}-N_{symbold}^{PSFCH}-2$, wherein lengthSLsymbols is a quantity of symbols of a sidelink communication slot, $N_{symbol}^{PSFCH}$ is a quantity of symbols occupied by a PSFCH, wherein $N_{symbol}^{PSFCH}=0$ or $N_{symbol}^{PSFCH}=3$, $M_{sc}^{PSCCH}(l)$ is a quantity of subcarriers in a data channel scheduling bandwidth, and wherein $M_{sc}^{PSCCH}(l)$ is a quantity that is of subcarriers in a control channel bandwidth on symbol l and that is configured by higher layer RRC, and wherein Q and $\bar{\beta}$ are integers.

9. The apparatus according to claim 8, wherein the processor is further configured to:
determine, based on the quantity of REs that are in the first time-frequency resource and that are used to transmit the data, a transport block size (TBS) for transmitting the data, wherein in a process of determining the TBS, a value of $\gamma$ is preconfigured.

10. The apparatus according to claim 8, wherein the value of $\gamma$ is 0.

11. The apparatus according to claim 8, wherein the value of lengthSLsymbols is configured by higher layer radio resource control (RRC).

12. The apparatus according to claim 8, wherein the first time-frequency resource comprises $N_{PSSCH}^{sub-ch}$ first sub-resources, wherein the first sub-resource comprises the first time unit in time domain and comprises one sub-channel in the data channel resource in frequency domain, and $N_{PSSCH}^{sub-ch}$ is a positive integer;
wherein the first information consists of first sub-information and second sub-information, the first sub-information is the control channel, wherein the control channel demodulation pilot, and the second-stage control information, and wherein the second sub-information comprises at least one of the data channel demodulation pilot, the PTRS, or the CSI-RS; and
wherein the processor being configured to determine the quantity of REs that are in the first time-frequency resource and that are used to transmit data comprises the processor being configured to:
determine, based on a quantity of REs that are in each first sub-resource and that are used to transmit the second sub-information, a sum of quantities of REs that are in each first sub-resource and that are used to transmit the data and the first sub-information; and
determine, based on the sum of the quantities of REs that are in each first sub-resource and that are used to transmit the data and the first sub-information, and a quantity of REs that are in the first time-frequency resource and that are used to transmit the first sub-information, the quantity of REs that are in the first time-frequency resource and that are used to transmit the data.

13. The apparatus according to claim 12, wherein a sum of quantities of REs that are in an $i^{th}$ first sub-resource in the first time-frequency resource and that are used to transmit the data and the first sub-information satisfies:

$$N'_{RE,i}=N_{SC}^{PRB}*N_{sub-ch}^{PRB}*N_{syml}^{sh'}-N_{DMRS}^{i}-N_{oh},$$

wherein $N'_{RE,i}$ represents the sum of the quantities of REs that are in the $i^{th}$ first sub-resource and that are used to transmit the data and the first sub-information, and i=0, 1, . . . , $N_{PSSCH}^{sub-ch}-1$; and wherein $N_{SC}^{PRB}$ represents a quantity of subcarriers in a physical resource block PRB, wherein $N_{sub-ch}^{PRB}$ represents a quantity of PRBs in the sub-channel, $N_{syml}^{sh'}$ represents a quantity of symbols in the first time unit that are available for encoding, wherein $N_{syml}^{sh'}=N_{syml}^{sh}-1_\alpha$, $N_{syml}^{sh}$ represents a quantity of symbols in the first time unit, wherein $1_\alpha$ represents a transport block adjustment factor, wherein $N_{DMRS}^i$ represents a quantity of REs that are in the $i^{th}$ first sub-resource and that are used to transmit the data channel demodulation pilot, and wherein $N_{oh}$ comprises a quantity of REs that are in the $i^{th}$ first sub-resource and that are used to transmit at least one of the PTRS or the CSI-RS, and wherein i is an integer.

14. The apparatus according to claim 13, wherein the quantity of REs that are in the first time-frequency resource and that are used to transmit the data satisfies:

$$N_{RE}=\Sigma_{i=0}^{N_{PSSCH}^{sub-ch}-1}N'_{RE,i}-N_{PSCCH}^{RE}-N_{oh_{SCI2}}^{RE},$$

wherein $N_{RE}$ represents the quantity of REs that are in the first time-frequency resource and that are used to transmit the data, wherein $N_{PSCCH}^{RE}$ represents a sum of quantities of REs that are in the first time-frequency resource and that are used to transmit the control channel and the control channel demodulation pilot in the first sub-information, and wherein $N_{oh_{SCI2}}^{RE}$ represents a quantity of REs that are in the first time-frequency resource and that are used to transmit the second-stage control information in the first sub-information.

15. A communication apparatus, comprising:
a processor; and
a non-transitory memory storing a program for execution by the processor, the program including instructions for:
determining, based on a quantity of resource elements (REs) that are in a first time-frequency resource and that are used to transmit first information, a quantity of REs that are in the first time-frequency resource and that are used to transmit data, wherein the first time-frequency resource comprises a first time unit in time domain and comprises a data channel resource in frequency domain, and the first information comprises at least one of a control channel, a control channel demodulation pilot, a data channel demodulation pilot, second-stage control information, a phase tracking reference signal (PTRS), or a channel state information reference signal (CSI-RS);

wherein the first information comprises the second-stage control information, and wherein a quantity $N_{oh_{SCI2}}^{RE}$ of REs that are in the first time-frequency resource and that are used to transmit the second-stage control information satisfies:

$$N_{oh\_SCI2}^{RE} = \min\left\{\left\lceil\frac{(O_{SCI2}+L_{SCI2})*\overline{\beta}}{R*Q}\right\rceil, \left\lceil\alpha\sum_{l=0}^{N_{syml}^{sh''}-1}\left(M_{sc}^{PSSCH}(l)-M_{sc}^{PSCCH}(l)\right)\right\rceil\right\} + \gamma,$$

wherein $O_{SCI2}$ represents a valid payload size of the second-stage control information, wherein $L_{SCI2}$ represents a cyclic redundancy check (CRC) bit length of the second-stage control information, wherein R represents a bit rate of a data channel, Q represents a modulation order of the control channel, wherein $\overline{\beta}$ represents a scale factor that is of a resource for the second-stage control information and that is indicated by first control information, wherein $\alpha$ represents the scale factor of the resource used to transmit the second-stage control information, wherein $\gamma$ is an integer and represents a quantity of REs that is defined to satisfy that the second-stage control information occupies an integer quantity of physical resource block (PRBs), wherein $N_{syml}^{sh''}=$lengthSLsymbols$-N_{symbol}^{PSPCH}-2$, wherein lengthSLsymbols is a quantity of symbols of a sidelink communication slot, $N_{symbol}^{PSFCH}$ is a quantity of symbols occupied by a PSFCH, wherein $N_{symbol}^{PSFCH}=0$ or $N_{symbol}^{PSFCH}=3$, $M_{sc}^{PSSCH}(l)$ is a quantity of subcarriers in a data channel scheduling bandwidth, and wherein $M_{sc}^{PSCCH}(l)$ is a quantity that is of subcarriers in a control channel bandwidth on symbol l and that is configured by higher layer RRC, and wherein Q and $\overline{\beta}$ are integers.

16. The communication apparatus according to claim 15, wherein the program further includes instructions for:
determining, based on the quantity of REs that are in the first time-frequency resource and that are used to transmit the data, a transport block size (TBS) for transmitting the data, wherein in a process of determining the TBS, a value of $\gamma$ is preconfigured.

17. The communication apparatus according to claim 15, wherein the value of $\gamma$ is 0.

* * * * *

UNITED STATES PATENT AND TRADEMARK OFFICE
CERTIFICATE OF CORRECTION

PATENT NO. : 12,302,290 B2
APPLICATION NO. : 17/871171
DATED : May 13, 2025
INVENTOR(S) : Guo et al.

It is certified that error appears in the above-identified patent and that said Letters Patent is hereby corrected as shown below:

In the Specification

In Column 3, Line 63, delete "$NN_{syml}^{sh}$" and insert -- $N_{syml}^{sh}$ --.

In Column 4, Line 7, delete "$N'^{RE,i}$" and insert -- $N'_{RE,i}$ --.

In Column 4, Line 43, after "information," delete "a" and insert -- $\alpha$ --.

In Column 5, Line 28, delete "i to" and insert -- l to --.

In Column 6, Line 21, delete "(ii):" and insert -- (11): --.

In Column 6, Line 39, after "and" delete "N" and insert -- $N_{symbol}^{PSFCH}$ --.

In Column 6, Line 42, delete "N=0;" and insert -- $N_{symbol}^{PSFCH}=0;$ --.

In Column 7, Line 12, delete "i to" and insert -- l to --.

In Column 7, Line 15, delete "i to" and insert -- l to --.

In Column 7, Line 16, delete "$M_{SC}^{PSSCH}(l)=M_{SC}^{PSCCH}M_{SC}^{PSSCH}$" and insert -- $M_{SC}^{PSCCH}(l)=M_{SC}^{PSCCH}. M_{SC}^{PSCCH}$ --.

In Column 7, Line 59, after "information," delete "a" and insert -- $\alpha$ --.

In Column 8, Line 58, delete "$N_{oh\_SCI2}$" and insert -- $N_{oh\_SCI2}^{RE}$ --.

In Column 10, Line 6, delete "$N_{RE}^{i}=N_{SC}^{RB}$" and insert -- $N_{RE}^{i}=N_{SC}^{PRB}$ --.

In Column 10, Line 15, delete "$N_{syml}^{sh'}=NN_{syml}^{sh}-1_{\alpha}, NN_{syml}^{sh}$" and insert Signed and Sealed this
Fifth Day of August, 2025

Coke Morgan Stewart
*Acting Director of the United States Patent and Trademark Office*

CERTIFICATE OF CORRECTION (continued)
U.S. Pat. No. 12,302,290 B2

-- $N_{syml}^{sh\prime}=N_{syml}^{sh}-1_\alpha$, $N_{syml}^{sh}$, --.

In Column 12, Line 8, delete "$N_{oh}$, $N_{oh\_SCI2}^{RRE}$," and insert -- $N_{oh}$, $N_{oh\_SCI2}^{RE}$, --.

In Column 20, Line 46, delete "/($N_{SC}^{PRB}$" and insert -- ($N_{SC}^{PRB}$ --.

In Column 22, Line 22, delete "i to" and insert -- 1 to --.

In Column 22, Line 25, delete "i to" and insert -- 1 to --.

In Column 22, Lines 26-27, delete "$M_{SC}^{PSSCH}$(l)=$M_{SC}^{P}{}_{SCCH}M_{SC}^{PSSCH}$" and insert -- $M_{SC}^{PSCCH}$(l)=$M_{SC}^{PSCCH}$. $M_{SC}^{PSCCH}$ --.

In Column 22, Line 62, after "information," delete "a" and insert -- α --.

In Column 26, Line 37, delete "i$^t$i" and insert -- i$^{th}$ --.

In Column 26, Line 63, delete "$N_{PSSCCH}^{RE}$" and insert -- $N_{PSCCH}^{RE}$ --.

In the Claims

In Column 39, in Claim 1, Line 54, after "quantity" delete "of".

In Column 39, in Claim 1, Line 60, delete "$N_{oh\_SCI2}^{RE}$=" and insert -- $N_{ohSCI2}^{RE}$= --.

In Column 40, in Claim 1, Line 15, delete "$N_{symbold}^{PSFCH}$=0" and insert -- $N_{symbol}^{PSFCH}$=0 --.

In Column 41, in Claim 8, Line 57, delete "$N_{oh\_SCI2}^{RE}$=" and insert -- $N_{ohSCI2}^{RE}$= --.

In Column 42, in Claim 8, Line 10, delete "$N_{symbold}^{PSFCH}$–2," and insert -- $N_{symbol}^{PSFCH}$–2, --.

In Column 44, in Claim 15, Line 11, delete "$N_{oh\_SCI2}^{RE}$=" and insert -- $N_{ohSCI2}^{RE}$= --.

In Column 44, in Claim 15, Line 30, delete "$N_{syml}^{sh0}$=" and insert -- $N_{syml}^{sh\prime\prime}$= --.